US008409708B2

(12) United States Patent
Kitamura

(10) Patent No.: US 8,409,708 B2
(45) Date of Patent: *Apr. 2, 2013

(54) BRIGHT PIGMENT

(75) Inventor: Takeaki Kitamura, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/682,953

(22) PCT Filed: Oct. 17, 2008

(86) PCT No.: PCT/JP2008/068899
§ 371 (c)(1),
(2), (4) Date: Apr. 14, 2010

(87) PCT Pub. No.: WO2009/051243
PCT Pub. Date: Apr. 23, 2009

(65) Prior Publication Data
US 2010/0227181 A1  Sep. 9, 2010

(30) Foreign Application Priority Data

Oct. 18, 2007 (JP) .................................. 2007-271664

(51) Int. Cl.
*B32B 5/16* (2006.01)
(52) U.S. Cl. ........ 428/403; 428/404; 428/405; 428/406; 428/407; 524/403; 524/406; 524/430; 524/431; 524/449; 524/612
(58) Field of Classification Search .......... 428/403–407; 524/403, 406, 430, 431, 449, 612
See application file for complete search history.

(56) References Cited

U.S. PATENT DOCUMENTS

| | | | |
|---|---|---|---|
| 3,370,971 A | 2/1968 | Linton | |
| 3,483,009 A | 12/1969 | Willis | |
| 3,497,374 A | 2/1970 | Nix | |
| 3,545,994 A | 12/1970 | Lott | |
| 3,585,160 A | 6/1971 | Miller et al. | |
| 3,711,433 A | 1/1973 | Willey et al. | |
| 4,084,983 A | 4/1978 | Bernhard et al. | |
| 4,239,548 A | 12/1980 | Barnard et al. | |
| 4,375,373 A | 3/1983 | Abe et al. | |
| 4,544,415 A | 10/1985 | Franz et al. | |
| 5,183,504 A | 2/1993 | Kuwajima et al. | |
| 5,223,034 A * | 6/1993 | Nitta et al. ..................... | 106/417 |
| 5,423,912 A | 6/1995 | Sullivan et al. | |
| 5,436,077 A | 7/1995 | Matsuba et al. | |
| 5,472,491 A * | 12/1995 | Duschek et al. .............. | 106/418 |
| 5,668,077 A | 9/1997 | Klopries et al. | |
| 5,734,068 A | 3/1998 | Klopries et al. | |
| 5,753,371 A | 5/1998 | Sullivan et al. | |
| 5,759,255 A | 6/1998 | Venturini et al. | |
| 5,874,072 A * | 2/1999 | Alwattari et al. ............. | 424/70.7 |
| 5,985,258 A * | 11/1999 | Alwattari et al. ............. | 424/70.7 |
| 6,033,466 A | 3/2000 | Ito | |
| 6,267,810 B1 | 7/2001 | Pfaff et al. | |
| 6,348,533 B1 | 2/2002 | Kishimoto et al. | |
| 6,488,867 B1 * | 12/2002 | Matsumoto et al. ..... | 252/301.21 |
| 6,491,932 B1 | 12/2002 | Ramin et al. | |
| 6,533,858 B1 | 3/2003 | Cacace et al. | |
| 6,620,868 B1 * | 9/2003 | Wilke .............................. | 524/94 |
| 6,630,018 B2 | 10/2003 | Bauer et al. | |
| 6,783,584 B2 | 8/2004 | Takahashi | |
| 6,821,333 B2 | 11/2004 | Zimmermann et al. | |
| 6,929,690 B2 | 8/2005 | Vogt et al. | |
| 7,413,599 B2 | 8/2008 | Henglein et al. | |
| 8,088,211 B2 | 1/2012 | Hashizuma et al. | |
| 2002/0031534 A1 | 3/2002 | Horino | |
| 2002/0064664 A1 | 5/2002 | Kishimoto et al. | |
| 2002/0096087 A1 | 7/2002 | Glausch | |
| 2003/0105201 A1 | 6/2003 | Auschra et al. | |
| 2003/0129149 A1 | 7/2003 | Pike et al. | |
| 2003/0166755 A1 | 9/2003 | Muhlebach et al. | |
| 2004/0134385 A1 | 7/2004 | Anselmann et al. | |
| 2004/0143032 A1 | 7/2004 | Auschra et al. | |
| 2004/0191198 A1 | 9/2004 | Hochstein et al. | |
| 2005/0004317 A1 | 1/2005 | Auschra et al. | |
| 2005/0014865 A1 | 1/2005 | Bagala et al. | |
| 2005/0257716 A1 | 11/2005 | Mazzella et al. | |
| 2006/0155007 A1 | 7/2006 | Huber | |
| 2006/0159634 A1 | 7/2006 | Heinrichs | |
| 2006/0159635 A1 | 7/2006 | Meyer et al. | |
| 2006/0223910 A1 | 10/2006 | Bagala | |
| 2007/0015012 A1 | 1/2007 | Bujard et al. | |
| 2007/0032573 A1 | 2/2007 | Yanagase et al. | |
| 2007/0212487 A1 | 9/2007 | Anselmann et al. | |
| 2007/0299196 A1 | 12/2007 | Ohkoshi et al. | |
| 2008/0306021 A1 | 12/2008 | Buerger et al. | |
| 2010/0047300 A1 | 2/2010 | Kaupp et al. | |
| 2010/0083872 A1 | 4/2010 | Kitamura et al. | |
| 2010/0129412 A1 | 5/2010 | Kitamura | |
| 2010/0137488 A1 | 6/2010 | Kitamura et al. | |
| 2010/0249304 A1 * | 9/2010 | Kitamura et al. ............. | 524/403 |

FOREIGN PATENT DOCUMENTS

DE  24 29 762  1/1976
DE  41 38 376  9/1993
(Continued)

OTHER PUBLICATIONS

Sun, et al., "preparation and characterization of the Mica Titanium . . . coated with ND207", Bulletin of the Chinese Ceramic society, vol. 25, No. 6, Dec. 2006.*
Sun, et al., "Preparation and Characterization of the Mica Titanium Optical Interferential Pigment Coated by Nd$_2$O$_3$", Bulletin of the Chinese Ceramic Society, vol. 25, No. 6, Dec. 2006—5 pp. 52835 Customer Number.
Kurata et al. "Saishin Funtai Bussei Zusetsu (Physical Properties of Powder Particles with Illustrations, Latest version), Third Edition," NGT Co., Jun. 30, 2004, p. 13, with its partial translation.

*Primary Examiner* — Leszek Kiliman
(74) *Attorney, Agent, or Firm* — Hamre, Schumann, Mueller & Larson, P.C.

(57) ABSTRACT

A bright pigment 100 includes: a flaky substrate 10; a first layer 20 that is formed on the flaky substrate 10 and that contains one selected from the group consisting of titanium dioxide, silver and a silver alloy as its main component; and a second layer 30 that is formed so that the first layer 20 is interposed between the flaky substrate 10 and the second layer 30 and that contains the hydroxide or hydrated oxide of neodymium.

9 Claims, 3 Drawing Sheets

FOREIGN PATENT DOCUMENTS

| | | | |
|---|---|---|---|
| DE | 19739124 | | 6/1998 |
| EP | 0 191 292 | | 8/1986 |
| EP | A0342533 | * | 5/1989 |
| EP | 0 342 533 | | 11/1989 |
| EP | 0649886 | * | 4/1995 |
| EP | 0 882 673 | | 12/1998 |
| EP | 1 469 042 | | 10/2004 |
| EP | 1 671 956 | | 6/2006 |
| EP | 1671956 | * | 6/2006 |
| JP | 46-009555 | | 3/1971 |
| JP | 48-032415 | | 10/1973 |
| JP | 55-018469 | | 5/1980 |
| JP | 60-092359 A | | 5/1985 |
| JP | 61-161212 | | 7/1986 |
| JP | 1-138270 A | | 5/1989 |
| JP | 1-292067 A | | 11/1989 |
| JP | 1-313575 A | | 12/1989 |
| JP | 3-054126 | | 3/1991 |
| JP | 3-066764 | | 3/1991 |
| JP | 4-025582 | | 1/1992 |
| JP | 4-193725 | | 7/1992 |
| JP | 6-319996 | | 11/1994 |
| JP | 7-018199 A | | 1/1995 |
| JP | 7-268241 | | 10/1995 |
| JP | 08-199098 | | 8/1996 |
| JP | 10-81837 | | 3/1998 |
| JP | 10-114867 | | 5/1998 |
| JP | 10-158572 | | 6/1998 |
| JP | 10-508599 | | 8/1998 |
| JP | 10-259317 | | 9/1998 |
| JP | 10-292152 | | 11/1998 |
| JP | 11-012426 A | | 1/1999 |
| JP | 11-130975 A | | 5/1999 |
| JP | 2000-505833 | | 5/2000 |
| JP | 2000-169122 | | 6/2000 |
| JP | 2001-031421 A | | 2/2001 |
| JP | 2001-072933 A | | 3/2001 |
| JP | 2001-89324 | | 4/2001 |
| JP | 2001-226601 | | 8/2001 |
| JP | 2001-234090 | | 8/2001 |
| JP | 2002-20218 | | 1/2002 |
| JP | 2002-509561 | | 3/2002 |
| JP | 2002-114934 | | 4/2002 |
| JP | 2002-155240 | | 5/2002 |
| JP | 2002-194247 | | 7/2002 |
| JP | 2002-200844 | | 7/2002 |
| JP | 2003-012461 | | 1/2003 |
| JP | 2003-213156 | | 7/2003 |
| JP | 2004-512394 A | | 4/2004 |
| JP | 2004-262794 | | 9/2004 |
| JP | 2004-275972 A | | 10/2004 |
| JP | 2004-533510 | | 11/2004 |
| JP | 2005-187782 | | 7/2005 |
| JP | 2006-176742 | | 7/2006 |
| JP | 2006-192384 A | | 7/2006 |
| JP | 2006-241012 | | 9/2006 |
| JP | 2006-257176 | | 9/2006 |
| JP | 2006-282572 A | | 10/2006 |
| JP | 2006-328182 | | 12/2006 |
| JP | 2007-051110 | | 3/2007 |
| JP | 2007-063127 | | 3/2007 |
| JP | 2007-077297 | | 3/2007 |
| JP | 2007-138053 | | 6/2007 |
| JP | 2007-217495 | | 8/2007 |
| LC | 2007-217319 | | 8/2007 |
| WO | 96/14278 | | 5/1996 |
| WO | 99/62646 | | 12/1999 |
| WO | WO 02/31058 A1 | | 4/2002 |
| WO | 02/090448 | | 11/2002 |
| WO | 03/006558 | | 1/2003 |
| WO | 2007/054379 | | 5/2007 |

* cited by examiner

BRIGHT PIGMENT

TECHNICAL FIELD

The present invention relates to a bright pigment with a pearly luster or a metallic luster. The present invention relates also to a resin composition, a paint, a printing ink, and a coated product, each containing the bright pigment.

BACKGROUND ART

The bright pigments are used widely for various applications, such as automobiles, motorcycles, OA (office automation) machines, cellular phones and home electric appliances, printing matters and writing tools, for the purpose of improving the cosmetic appearance thereof.

As bright pigments, there have been conventionally known mica flakes and graphite flakes each coated with metal oxides such as titanium dioxide and iron oxide, iron oxide particles composed mainly of alpha-iron oxide crystals, and the like. Such a bright pigment reflects light incident from the outside upon its surface and shines brilliantly. Therefore, the bright pigment gives an unique, varied and excellent cosmetic appearance, when contained in a paint, to the coated surfaces, when contained in an ink, to the drawn lines or the printed surfaces, or when contained in a resin composition, to the surfaces of resin molded product, in synergy with the color tones of each of the base.

Among pearl colors, for example, a so-called white pearl color with high whiteness is popular particularly for coating luxury automobiles. The coating with a white pearl color can be achieved generally by a multilayer coating film formed of three films, that is, a base-coat film containing a titanium dioxide pigment, a metallic base-coat film containing a bright pigment with a pearly luster in which flaky substrates each are coated with titanium dioxide, and a top clear-coat film.

As one of the causes that impair the fine appearance of the coating with a white pearl color, faint yellow in the titanium dioxide pigment and yellow turbidity due to the complementary color of the interference color derived from the bright pigment can be mentioned. Bright pigments to be used for paints for automobiles and motorcycles for outdoor use may include a coating layer containing the hydroxide or hydrated oxide of cerium for preventing the photocatalytic activity of the titanium dioxide. There is, however, a problem that the hydroxide or hydrated oxide of cerium is likely to cause yellow turbidity. As to such a coating layer containing the hydroxide or hydrated oxide of cerium, the following techniques are conventionally known.

JP 60(1985)-92359 A, for example, discloses a pigment in which polysiloxane and an oxide or hydroxide of cerium are deposited on mica flakes coated with a metal oxide.

JP 1(1989)-292067 A discloses a pigment in which the following hydrates (i) and (ii) are deposited on the surface of mica flakes coated with a metal oxide. The hydrates are: (i) a hydrated zirconium oxide produced by hydrolysis of a zirconium compound in the presence of hypophosphorous acid; and (ii) a hydrated oxide produced by hydrolysis of a water-soluble compound of at least one metal selected from the group consisting of cobalt, manganese, and cerium.

JP 7(1995)-18199 A discloses a pigment in which a sheet-shaped fine substrate coated with a metal oxide is coated with a covering layer. The covering layer contains silicon dioxide, the hydroxide or hydrated oxide of cerium, aluminum or zirconium, and an organic coupling agent.

JP 1(1989)-313575 A discloses use of a fluorescent whitening agent as a countermeasure to the yellow turbidity in the coating with a white pearl color.

JP 11(1999)-130975 A discloses a composition of a fluorescent organic white pigment that has an excellent masking effect, as a substitute for the titanium dioxide pigment to be used for white base-coat films.

JP 2006-192384 A discloses a bright base-coat film containing a bright pigment and a fluorescent white pigment, in a multilayer coating film formed by subsequently forming a colored base-coat film, a bright base-coat film and clear-coat film on a substrate.

These fluorescent whitening agents absorb ultraviolet rays (with a wavelength of around 380 nm) and emit blue fluorescence (with a wavelength of around 440 nm). For this reason, when they are used in a yellowish coating film, blue luminescence occurs additionally therein, thereby producing the effect of a shiny white appearance on the film.

As another countermeasure to the yellow turbidity in the coating with a white pearl color, JP 2004-275972 A discloses a method for forming a multilayer coating film in which a color base paint containing a colored pigment, a mica base paint containing an interference mica pigment and a clear paint are subsequently applied onto a base material formed with an undercoat film and a middle coat film. The above-mentioned mica base paint, as well as the interference mica pigment, contains titanium oxide fine particles with an average particle size of 0.01 to 0.1 μm in which the surface of each particle is covered by a coating layer composed of alumina and/or zirconia formed thereon.

However, the yellow turbidity in the coating film is due to the bright pigment whose hue varies depending on the angle of view, and therefore the use of fluorescent whitening agents or titanium oxide fine particles does not have a significant effect on the reduction of the yellow turbidity. Rather, fluorescent whitening agents suffer from problems, such as a rapid reduction of the whitening effect in outdoor use with time because of their poor weather resistance, and a quantitative limitation in use because of concentration quenching. The titanium oxide fine particles also are problematic because they scatter the reflected light from the bright pigment and reduce the brightness of the bright pigment.

On the other hand, among metallic colors, a so-called metallic silver color with good shadow quality is popular for coating sports sedans, because it makes the style of an automobile distinctive. The coating with a metallic silver color can be achieved by a multilayer coating film formed of two films, that is, a color metallic base-coat film and a top clear-coat film. The color metallic base-coat film often contains a colored pigment of carbon and titanium oxide, and aluminum flakes. In order to improve the shadow quality, there is an attempt in which flaky glass coated with silver having a high reflectance of visible light is used as a bright pigment instead of the aluminum flakes.

However, the silver-containing coating layer has a high reflectance on the long wavelength side (more than 500 nm and 700 nm or less), and has a low reflectance on the short wavelength side (500 nm or less). Therefore, yellow turbidity is likely to appear also in the coating with a metallic silver color that includes a bright pigment having a silver-containing coating layer. These problems also are mentioned in JP 2001-72933 A.

DISCLOSURE OF THE INVENTION

The present invention has been accomplished in view of the above problems, and it is an object of the present invention to provide a bright pigment in which yellow turbidity is not likely to appear.

The present invention provides a bright pigment including: a flaky substrate; a first layer that contains one selected from a group consisting of titanium dioxide, silver, and a silver alloy as its main component and is formed on the flaky substrate; and a second layer that contains the hydroxide or hydrated oxide of neodymium, and is formed so that the first layer is interposed between the flaky substrate and the second layer.

According to another aspect of the present invention, there is provided a resin composition, a paint, a printing ink and a coated product containing the above-mentioned bright pigment.

The coating layer of the hydroxide or hydrated oxide of neodymium has a transparent blue color (lavender). Therefore, by providing a layer containing the hydroxide or hydrated oxide of neodymium, yellow turbidity due to the complementary color of the base, such as titanium dioxide, or diffuse reflection of the object color is cancelled. A coating layer containing the hydroxide or hydrated oxide of aluminum or zirconium has no color cancellation effect, though it has an ultraviolet absorptivity, because of being colorless and transparent. Further, the second layer containing the hydroxide or hydrated oxide of neodymium has a high ultraviolet absorptivity, and thus has an effect of decreasing the activity of the first layer containing one selected from the group consisting of titanium dioxide, silver and a silver alloy as its main component.

BEST MODE FOR CARRYING OUT THE INVENTION

Figure 1:
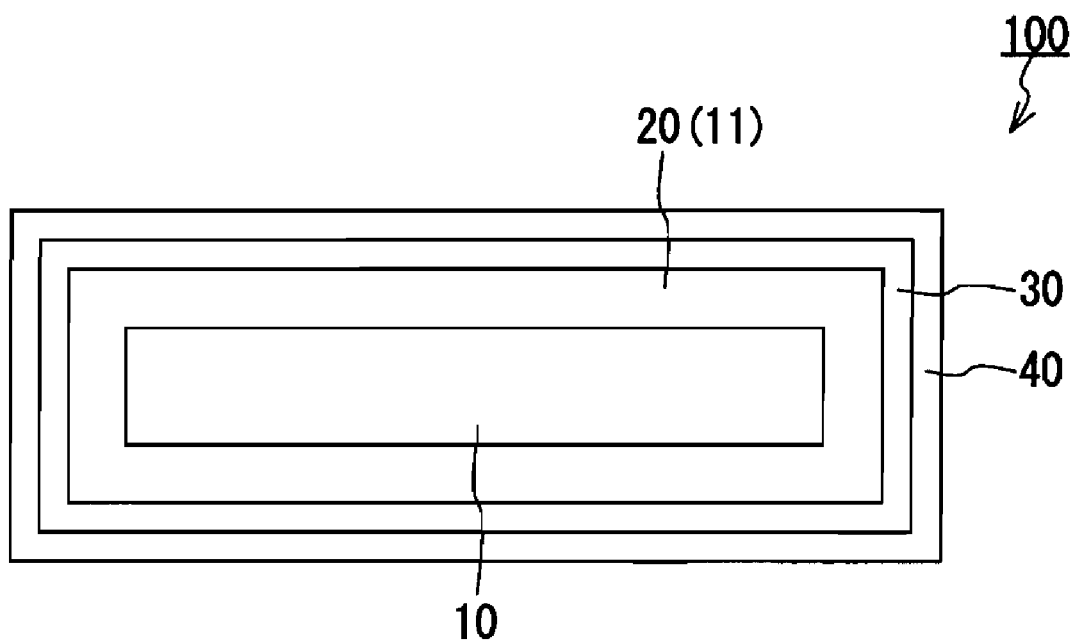
FIG. 1 is a cross-sectional view of an example of a bright pigment according to the present invention.

FIG. 1 is a cross-sectional view of an example of a bright pigment according to the present invention. As shown in FIG. 1, the bright pigment 100 with a pearly luster includes a flaky substrate 10, a titanium dioxide layer (first layer) 20, a neodymium-containing layer (second layer) 30, and a surface layer 40. These layers are stacked on the flaky substrate 10 in this order.

The titanium dioxide layer 20 contains titanium dioxide as its main component and is a layer coating the flaky substrate 10 directly. The flaky substrate 10 may be coated with a silver-containing layer 11 that contains silver or a silver alloy as its main component instead of the titanium dioxide layer 20. The "main component" herein means a component with the highest content by mass %.

The neodymium-containing layer 30 contains the hydroxide or hydrated oxide of neodymium and is a layer coating the titanium dioxide layer 20. The neodymium-containing layer 30 may contain a hydroxide or hydrated oxide of at least one metal selected from the group consisting of lanthanum, cerium, tungsten, aluminum, zirconium, molybdenum and vanadium in addition to the hydroxide or hydrated oxide of neodymium.

The surface layer 40 contains a silane coupling agent and/or a compound having an oxazoline group and is a layer coating the neodymium-containing layer 30.

Each component mentioned above will be described below.

(Flaky Substrate)

It is preferable that the flaky substrate 10 is composed substantially of one selected from the group consisting of glass, mica, synthetic mica, silica, and alumina. There is no particular limitation thereon, but it is preferable to use flaky glass having high surface smoothness as well as high transparency. Flaky glass coated with titanium dioxide can exhibit beautiful interference colors. The word "substantially" herein means that a slight amount of unavoidable impurities, additives or the like is allowed to be mixed therein as long as it has no significant influence on the properties.

The flaky glass to be used for the present invention can be produced by the blowing method. In the blowing method, raw cullet is melted and the molten glass is drawn continuously through a circular slit. During the drawing of the molten glass, air is blown through a blow nozzle provided inside the circular slit while stretching and blowing up the molten glass into a balloon shape. The balloon-shaped glass with a smaller thickness then is crushed into flakes, and thus the flaky glass is obtained.

The surface of the flaky glass produced by such a method retains a fire-polished surface with smoothness as it is at the time of melt-molding. The flaky glass reflects light well because of its smooth surface. A paint or a resin composition blended with this flaky glass has high brightness. Examples of such flaky glass include MICROGLAS (registered trademark) GLASFLAKE (registered trademark) series (RCF-160, REF-160, RCF-015, REF-015) that are commercially available from Nippon Sheet Glass Co., Ltd.

(Titanium Dioxide Layer)

Preferably, the titanium dioxide layer 20 that coats the flaky substrate 10 is composed substantially of rutile-type titanium dioxide. Titanium dioxide has three crystal types: anatase-type crystal; brookite-type crystal; and rutile-type crystal. Among these, anatase-type titanium dioxide and rutile-type titanium dioxide are produced industrially. Anatase-type titanium dioxide has strong photocatalytic activity. On the other hand, rutile-type titanium dioxide has only about one tenth of the photocatalytic activity of the anatase-type titanium dioxide, and therefore is used suitably for a pigment in terms of preventing discoloration and decomposition as much as possible. Furthermore, the rutile-type titanium dioxide has a higher refractive index than that of the anatase-type titanium dioxide, and allows a dense and uniform coating layer to be formed easily. Therefore, the rutile-type titanium dioxide can provide excellent light interference colors.

As a method of producing rutile-type titanium dioxide, for example, JP 2001-31421 A discloses a method in which the rutile-type titanium dioxide is precipitated from a titanium-containing solution by neutralization under the conditions at a temperature of 55° C. to 85° C. and a pH of not more than 1.3. This method does not require intrinsically heating for crystal transition and allows the rutile-type titanium dioxide to be deposited easily on a substrate having low heat resistance. In the bright pigment 100, the thickness of the rutile-type titanium dioxide layer 20 is, for example, in a range of 20 to 400 nm.

Examples of flaky glass that is coated with rutile-type titanium dioxide and exhibits interference colors include METASHINE (registered trademark) RC series, such as MC5090RS, MC5090RY, MC5090RR, MC5090RB, MC5090RG, MC1080RS, MC1080RY, MC1080RR, MC1080RB, MC1080RG, MC1040RS, MC1040RY, MC1040RR, MC1040RB, MC1040RG, MC1030RS, MC1030RY, MC1030RR, MC1030RB, MC1030RG, MC1020RS, MC1020RY, MC1020RR, MC1020RB, MC1020RG, which are commercially available from Nippon Sheet Glass Co., Ltd.

(Silver-containing Layer)

The silver-containing layer 11 is a layer containing silver or a silver alloy, which may be composed substantially of silver or the silver alloy. In view of ensuring high brightness, provided that the total mass of the bright pigment 100 is 100 mass %, the content of silver (or silver in the silver alloy) is preferably 10 mass % or more, more preferably 15 mass % or more, further preferably 20 to 25 mass % or more.

As a silver alloy, for example, silver-gold alloy, silver-palladium alloy, silver-platinum alloy, silver-gold-palladium alloy, silver-platinum-palladium alloy and silver-gold-platinum alloy can be mentioned. Silver alloys have higher water resistance and corrosion resistance than silver alone. In the case where the silver-containing layer 11 is a layer containing a silver alloy, the water resistance and corrosion resistance of the coating film that has been formed using an ink or paint containing the bright pigment 100 are improved.

The method for forming the silver-containing layer 11 on the surface of the flaky substrate 10 is not particularly limited, but various conventional film forming methods can be applied thereto. Examples of the flaky glass coated with silver include METASHINE (registered trademark) PS series, such as MC2080PS, MC5480PS, MC5230PS, MC5150PS, MC5090PS, MC5030PS, ME2040PS, and ME2025PS, which are commercially available from Nippon Sheet Glass Co., Ltd.

(Shape and Dimensions of Bright Pigment)

The shape of the bright pigment 100 is not particularly limited because it varies depending on the intended use thereof. Generally, it is preferable that the average particle size is in a range of 1 μm to 500 μm and the average thickness is in a range of 0.1 μm to 10 μm. In the case where the particle size of the bright pigment 100 is excessively large, breakage occurs easily when the bright pigment 100 is blended in a paint or a resin composition. Particularly in the case where the flaky glass is used as the substrate 10, alkaline components contained in the glass may diffuse due to the exposure of the cross sections of the substrate 10. On the other hand, in the case where the particle size is excessively small, the planes of the bright pigment 100 are oriented in random directions in the paint or resin composition, which reduces the reflected light emitted by individual particles. As a result, the brightness may decrease.

When the bright pigment 100 is used for paints, it is preferable that the particle size is smaller. Preferably, the average particle size thereof is 1 μm to 50 μm and the average thickness thereof is 0.1 μm to 3 μm. The average particle size refers to a particle size corresponding to 50% of a cumulative volume in a particle distribution measured with a laser diffraction scattering particle size analyzer.

(Neodymium-containing Layer)

The neodymium-containing layer 30 is a layer containing the hydroxide or hydrated oxide of neodymium, which absorbs ultraviolet rays so as to decrease the activity of the rutile-type titanium dioxide layer 20 as well as reducing the hue of the yellow turbidity in the bright pigment 100. The effect is high when the neodymium content of in the neodymium-containing layer 30 is 50 mass % or more in terms of the neodymium. As aforementioned, the neodymium-containing layer 30 further may contain a hydroxide or hydrated oxide of at least one metal selected from the group consisting of lanthanum, cerium, tungsten, aluminum, zirconium, molybdenum and vanadium. However, cerium tends to cause yellow turbidity, and therefore attention should be paid for the content thereof.

(Hydroxide or Hydrated Oxide of Neodymium)

The Hydroxide or Hydrated Oxide of Neodymium can be Precipitated on particles (flaky substrates coated with titanium dioxide) by the reaction between a water-soluble neodymium compound and an alkali. Examples of the neodymium compound that can be used include mineral acid salts such as neodymium sulfate, neodymium chloride, neodymium nitrate, neodymium phosphate, neodymium carbonate, and neodymium acetate. The hydroxide or hydrated oxide of neodymium can be precipitated by the reaction between the neodymium compound and an alkali such as an alkali metal hydroxide. Preferably, the water-soluble neodymium compound is neodymium nitrate and the alkali to react therewith is a sodium hydroxide solution. Preferably, the amount of the neodymium compound to be added to an aqueous slurry for forming a coating layer is in a common range of about 0.1 to 10 mass %, in terms of the neodymium, with respect to the total mass of the titanium dioxide coating the flaky substrates (i.e., a percentage of neodymium content with respect to the titanium dioxide). More preferably, the amount of the neodymium compound to be added thereto is in a range of about 0.5 to 5 mass % with respect to the titanium dioxide. The alkali is added to the slurry in an amount sufficient to react with the neodymium compound to precipitate the hydroxide or hydrated oxide of neodymium on the particles.

A hydroxide or hydrated oxide of at least one metal selected from the group consisting of lanthanum, cerium, tungsten, aluminum, zirconium, molybdenum and vanadium may be precipitated on particles (flaky substrates coated with titanium dioxide) concurrently with the precipitation of the hydroxide or hydrated oxide of neodymium, or may be precipitated subsequently. The following describes a common process for precipitating them subsequently.

(Hydroxide or Hydrated Oxide of Cerium)

The Hydroxide or Hydrated Oxide of Cerium can be Precipitated on Particles (flaky glass substrates coated with titanium dioxide) by the reaction between a water-soluble cerium compound and an acid or alkali. Examples of the acidic cerium compound include mineral acid salts such as cerium sulfate, cerium chloride, and cerium nitrate. The acidic cerium compound can precipitate the hydroxide or hydrated oxide of cerium by the reaction with an alkali such as an alkali metal hydroxide. Preferably, the water-soluble cerium compound is cerium nitrate, and the alkali to react with cerium nitrate is a sodium hydroxide solution. Alkaline cerium salts such as cerium ammonium sulfate and cerium ammonium nitrate may be used instead of an acidic cerium compound. An alkaline cerium salt reacts with an acid such as sulfuric acid and hydrochloric acid to precipitate the hydroxide or hydrated oxide of cerium. Preferably, the amount of the cerium compound to be added to an aqueous slurry for forming coating layers is in a common range of about 0.1 to 10 mass %, in terms of the cerium, with respect to the total mass of the titanium dioxide coating the flaky substrates (i.e., a percentage of the cerium content with respect to the titanium dioxide). More preferably, the amount of the cerium compound to be added thereto for forming the coating layers is in a range of about 0.5 to 5 mass % with respect to the titanium dioxide. The acid or alkali to be used is added to the slurry in an amount sufficient to react with the cerium compound to precipitate the hydroxide or hydrated oxide of cerium on the particles.

(Hydroxide or Hydrated Oxide of Lanthanum)

The hydroxide or hydrated oxide of lanthanum can be precipitated on particles (flaky glass substrates coated with titanium dioxide) by the reaction between a water-soluble lanthanum compound and an acid or alkali. Examples of the lanthanum compound include mineral acid salts such as lanthanum sulfate, lanthanum chloride, lanthanum nitrate, lanthanum acetate, and lanthanum carbonate. The lanthanum compound can precipitate the hydroxide or hydrated oxide of lanthanum by the reaction with an alkali such as an alkali metal hydroxide. Preferably, the water-soluble lanthanum compound is lanthanum nitrate, and the alkali to react with lanthanum nitrate is a sodium hydroxide solution. Preferably, the amount of the lanthanum compound to be added to an aqueous slurry is in a common range of about 0.1 to 10 mass %, in terms of the lanthanum, with respect to the titanium dioxide. More preferably, the amount of the lanthanum compound to be added thereto is in a range of about 0.5 to 5 mass % with respect to the titanium dioxide. The acid or alkali is added to the slurry in an amount sufficient to react with the lanthanum compound to precipitate the hydroxide or hydrated oxide of lanthanum on the particles.

(Hydroxide or Hydrated Oxide of Tungsten)

The Hydroxide or Hydrated Oxide of Tungsten can be Precipitated on Particles (flaky glass substrates coated with titanium dioxide) by the reaction between a water-soluble tungsten compound and an acid. Examples of the tungsten compound include mineral acid salts such as sodium tungstate, potassium tungstate, ammonium metatungstate, and ammonium paratungstate. Preferably, the water-soluble tungsten compound is sodium tungstate, and as an acid to react with sodium tungstate, a phosphoric acid such as orthophosphoric acid, pyrophoric acid, polyphosphoric acid, and metaphosphoric acid, can be used. Preferably, the amount of the tungsten compound to be added to an aqueous slurry is in a common range of about 0.1 to 10 mass %, in terms of the tungsten, with respect to the titanium dioxide. More preferably, the amount of the tungsten compound to be added thereto is in a range of about 0.5 to 5 mass % with respect to the titanium dioxide. The acid is added to the slurry in an amount sufficient to react with the tungsten compound to precipitate the hydroxide or hydrated oxide of tungsten on the particles.

(Hydroxide or Hydrated Oxide of Aluminum)

The Hydroxide or Hydrated Oxide of Aluminum can be Precipitated on particles (flaky substrates coated with titanium dioxide) by the reaction between an acidic or alkaline aluminum compound and an appropriate alkali or acid. Examples of the acidic aluminum compound include an aluminum salt of a mineral acid such as aluminum chloride, aluminum sulfate, and aluminum nitrate. Examples of the alkaline aluminum compound include alkali metal aluminate such as sodium aluminate. The amount of the acidic or alkaline aluminum compound to be added to a slurry is in a common range of about 0.1 to 10 mass %, in terms of the aluminum, with respect to the titanium dioxide. Preferably, the amount of the aluminum compound to be added thereto is in a range of about 0.5 to 5 mass %. The acid or alkali is added to the slurry in an amount sufficient to precipitate the hydroxide or hydrated oxide of aluminum on the substrates simultaneously with or subsequent to the addition of the aluminum compound.

(Hydroxide or Hydrated Oxide of Molybdenum)

The hydroxide or hydrated oxide of molybdenum can be precipitated on particles (flaky substrates coated with titanium dioxide) by the reaction between a water-soluble molybdenum compound and an acid. Examples of the molybdenum compound include sodium molybdate (VI) ($Na_2MoO_4 \cdot 2H_2O$), ammonium molybdate (VI) (($NH_4)_6Mo_7O_{24} \cdot 4H_2O$), molybdenum (V) chloride ($MoCl_5$), molybdenum (VI) trioxide ($MoO_3$), and zinc molybdate (VI) ($ZnMoO_4$). Preferably, the water-soluble molybdenum compound is sodium molybdate (VI), and as an acid to react with sodium molybdate (VI), a phosphoric acid, such as orthophosphoric acid, pyrophosphoric acid, polyphosphoric acid, and metaphosphoric acid, can be used. Preferably, the amount of the molybdenum compound to be added to an aqueous slurry is in a common range of about 0.1 to 10 mass %, in terms of the molybdenum, with respect to the titanium dioxide. More preferably, the amount of the molybdenum compound to be added thereto is in a range of about 0.5 to 5 mass % with respect to the titanium dioxide. The acid is added to the slurry in an amount sufficient to react with the molybdenum compound to precipitate the hydroxide or hydrated oxide of molybdenum on the particles.

(Hydroxide or Hydrated Oxide of Vanadium)

The Hydroxide or Hydrated Oxide of Vanadium can be Precipitated on particles (flaky substrates coated with titanium dioxide) by the reaction between a water-soluble vanadium compound and an acid. Examples of the vanadium compound include sodium vanadate (V) ($NaVO_3$), potassium vanadate (V) ($KVO_3$), ammonium vanadate (V) ($NH_4VO_3$), vanadium (V) pentoxide ($V_2O_5$), vanadium (III) trichloride ($VCl_3$), and bis(maltolato)oxovanadium (IV) ($C_{12}H_{10}O_7V$). Preferably, the water-soluble vanadium compound is sodium vanadate (VI), and as an acid to react with sodium vanadate (VI), a phosphoric acid, such as orthophosphoric acid, pyrophosphoric acid, polyphosphoric acid, and metaphosphoric acid, can be used. Preferably, the amount of the vanadium compound to be added to an aqueous slurry is in a common range of about 0.1 to 10 mass %, in terms of the vanadium, with respect to the titanium dioxide. More preferably, the amount of the vanadium compound to be added thereto is in a range of about 0.5 to 5 mass % with respect to the titanium dioxide. The acid is added to the slurry in an amount sufficient to react with the vanadium compound to precipitate the hydroxide or hydrated oxide of vanadium on the particles.

Meanwhile, a hydrated oxide of metal is referred to also as a metal oxide. For example, a hydrated oxide of tungsten ($WO_4 \cdot nH_2O$ (n is a positive integer)) is referred to also as tungstic acid ($H_2WO_4$). Further, a metal salt of the hydrated oxide of tungsten ($xMO \cdot yWO_3 \cdot zH_2O$) is referred to also as tungstate ($MWO_4$). It should be noted that the above-mentioned M denotes at least one selected from the group consisting of Na, Ca, and Zr, and x and y satisfy the relationship of $x=y=1$ (including the case of $z=0$).

It is preferable that the content of the neodymium-containing layer 30 is about 0.1 to 10 mass %, in terms of the neodymium as a simple substance or the total mass of the metals including neodymium and other metals, with respect to the total mass of the titanium dioxide, silver, or silver alloy coating the flaky substrates. More preferably, the content of the neodymium-containing layer 30 is about 0.5 to 5 mass % with respect to the titanium dioxide, silver, or silver alloy. In the case where the content thereof is less than 0.1 mass %, not much effect on improving the weather resistance can be expected. On the other hand, in the case where the content thereof exceeds 10 mass %, the design values may decrease.

Particularly, in the case where the neodymium-containing layer 30 contains the hydroxide or hydrated oxide of cerium, it is recommended that the content of the cerium is set to at most about 3 mass % with respect to the titanium dioxide.

Thereby, cerium-derived yellow coloration that may cause a negative effect in the design values can be prevented without fail.

By forming the neodymium-containing layer 30, yellow turbidity is reduced, as shown in the examples to be described later. Further, the weather resistance of the bright pigment 100 and the coating film including the same is improved. It is not clear at present why the weather resistance is improved, but the present inventors consider as follows.

In the case of a conventional bright pigment consisting of a flaky substrate and a rutile-type titanium dioxide layer coating the flaky substrate, the photocatalytic activity thereof is enhanced to degrade the surrounding matrix resin upon exposure to strong ultraviolet rays, although the photocatalytic activity thereof is only about one tenth of that of anatase-type titanium dioxide. In contrast, the bright pigment 100 of the present embodiment includes the neodymium-containing layer 30 having a strong ultraviolet absorbing effect, which prevents the enhancement of the photocatalytic activity of the titanium dioxide layer 20. Thus, the weather resistance of the bright pigment and the coating film including the same is improved.

In the case of the bright pigment in which the flaky substrates are coated with silver or a silver alloy instead of titanium dioxide, providing of the neodymium-containing layer 30 that absorbs ultraviolet rays prevents the formation of silver colloid, which thus prevents yellowing due to silver colloid. The formation of silver colloid is likely to be promoted not only by a catalyst for oxidizing silver but also by a redox reaction accompanied by the oxidation of a substance present in the same system due to ultraviolet rays. The formation of silver colloid is inhibited by the neodymium-containing layer 30 blocking ultraviolet rays.

(Surface Layer)

The surface layer 40 is a layer containing a coupling agent and/or an oxazoline compound and forms the top surface of the bright pigment 100. In the following, an example in which the surface layer 40 is formed by an oxazoline compound.

The oxazoline compound layer 40 (surface layer 40) is provided in order to cause a matrix having a carboxyl group to adhere firmly to the bright pigment 100.

Figure 3:
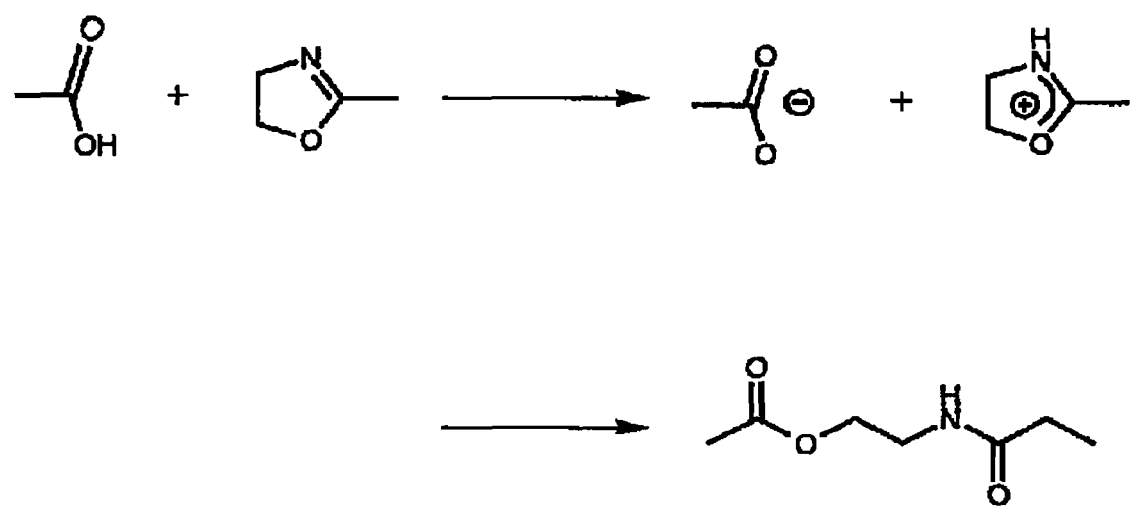
FIG. 3 is a diagram illustrating a mechanism of reaction between an oxazoline group and a carboxyl group.

When the bright pigment 100 including the oxazoline compound layer 40 as its top surface is added to a carboxyl group-containing matrix such as a resin having a carboxyl group, an oxazoline group opens its ring to form an amide ester bond with the carboxyl group during, for example, forming of a coating film, as shown in the reaction formula of FIG. 3. In other words, the carboxyl group and the oxazoline group are crosslinked and cured three-dimensionally on the surface of the bright pigment 100. This curing reaction is a ring-opening reaction of the oxazoline group. Since this reaction does not produce any by-product, the orientation of the bright pigment 100 is improved. Thus, high design values can be obtained. Furthermore, the carboxyl group hardly remains in the interface between the carboxyl group-containing matrix and the bright pigment 100. Accordingly, the water resistant secondary adhesion (adhesion after water resistance test) of the pigment can be improved significantly, and thus the long-lasting pearly luster or metal luster can be obtained.

The ring-opening reaction of the oxazoline group proceeds efficiently during, for example, drying of the coating film containing the bright pigment 100. In materials for a water-based paint and coating agent, a carboxyl group in a carboxyl group-containing matrix usually is neutralized with volatile amine or ammonia. Since the oxazoline group does not react with a carboxylic acid salt, the water-based paint and coating agent are stable in the liquid state. When the neutralizer volatilizes during drying of the coating film, the carboxyl group is regenerated. With this regeneration, the above-mentioned ring-opening reaction proceeds.

Specifically, since the volatile neutralizer works as a blocking agent, the gelation of a material such as a water-based paint and coating agent containing the bright pigment 100 does not proceed and thus it is stable in the liquid state. During drying of the coating film, amide esterification reaction develops between the oxazoline group and the carboxyl group. As a result, the carboxyl group hardly remains in the vicinity of the interface between the bright pigment 100 and the resin as a matrix. Accordingly, water penetration due to the hydrophilicity of the carboxyl group into the coating film is prevented, and thus the water resistant secondary adhesion of the coating film is improved.

As the oxazoline compound to be used for forming the oxazoline compound layer 40, a polyvalent oxazoline compound having a plurality of oxazoline groups in one molecule is preferable. The polyvalent oxazoline compound may be a polymer or a low-molecular-weight compound such as an oligomer, as long as it has two or more oxazoline rings in one molecule.

(Oxazoline Ring-containing Polymer)

As an oxazoline compound, an oxazoline ring-containing polymer that functions as a resin crosslinking-type surface treatment agent can be used. There is no particular limitation on such an oxazoline ring-containing polymer as long as it is a polymer having an oxazoline group represented by the following general formula (1). For example, this oxazoline ring-containing polymer can be obtained by polymerizing, in an aqueous medium, a monomer component including an addition polymerizable oxazoline as an essential component and, if necessary, further including other unsaturated monomers (such as, acrylic acid, methacrylic acid, and derivatives thereof, for example) by a conventionally known polymerization method. In the formula (1), $R^1$, $R^2$, $R^3$ and $R^4$ each are a hydrogen atom, a halogen atom, an alkyl group, an aralkyl group, a phenyl group, or a substituted phenyl group. They may be the same or may be different from each other.

Chemical formula 1:

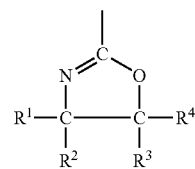

Examples of the above-mentioned addition polymerizable oxazoline include compounds represented by the following general formula (2). In the formula (2), $R^1$, $R^2$, $R^3$ and $R^4$ are the same as those mentioned above. $R^5$ is a non-cyclic organic group having an addition polymerizable unsaturated bond.

Chemical formula 2:

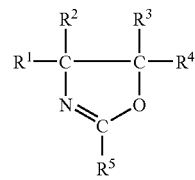

Specific examples of the above-mentioned compounds include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. One of these compounds can be used independently or two or more of them can be used in combination. Among these compounds, 2-isopropenyl-2-oxazoline is suitable because it is industrially easily available.

The amount of the above-mentioned addition polymerizable oxazoline to be used is not particularly limited, but it preferably is, for example, not less than 5 mass % with respect to 100 mass % of the total amount of monomer components to be used for producing an oxazoline ring-containing polymer. In the case where the amount of the addition polymerizable oxazoline is less than 5 mass %, a crosslink between the bright pigment 100 and a matrix resin is not strong enough, and thus not much effect on improving the durability and water resistance can be expected. There is no particular limitation on the other unsaturated monomer as long as it is copolymerizable with an addition polymerizable oxazoline and does not react with an oxazoline group. For example, one of the above-mentioned unsaturated monomers can be used independently or two or more of them can be used in combination.

The above-mentioned oxazoline ring-containing polymer preferably is water-soluble, water-reducible or water-dispersible, and more preferably it is water-soluble. In order to obtain the water-soluble oxazoline ring-containing polymer, the ratio of the hydrophilic monomers in the monomer components to be subjected to polymerization preferably is not less than 50 mass %, and more preferably in the range of 60 to 90 mass % from the viewpoint of water solubility and curability. Examples of the hydrophilic monomer include the above-mentioned addition polymerizable oxazoline, 2-hydroxyethyl (meth)acrylate, methoxypolyethylene glycol (meth) acrylate, monoesterified products of (meth)acrylic acid and polyethylene glycol, 2-aminoethyl (meth)acrylate and its salts, sodium (meth)acrylate, ammonium (meth)acrylate, (meth)acrylonitrile, (meth)acrylamide, N-methylol(meth) acrylamide, N-(2-hydroxyethyl)(meth)acrylamide, and sodium styrenesulfonate. Among these, unsaturated monomers each having a polyethylene glycol chain such as the methoxypolyethylene glycol (meth)acrylate and monoesterified products of (meth)acrylic acid and polyethylene glycol are preferred because of their high water solubility.

The polymerization method for obtaining the above-mentioned oxazoline ring-containing polymer is not particularly limited, but various conventional polymerization methods can be applied thereto. Examples thereof include solution polymerization, emulsion polymerization, suspension polymerization, and bulk polymerization, each performed in an aqueous medium. Reaction conditions may be set according to the composition of the monomer components and so forth, and they are not particularly limited. Preferably, the reaction temperature is in the range of 20 to 150° C., and the reaction time is in the range of 1 to 24 hours, for example. In addition, the monomer components, for example, may be added to a reactor in a lump or may be added thereto in drops continuously or gradually. It is more preferable to carry out the polymerization under an atmosphere of inert gas such as nitrogen gas.

The oxazoline value of the polymer is preferably in the range of 50 to 3000 g solid/eq., more preferably 100 to 2000 g solid/eq., and further preferably 200 to 1500 g solid/eq. Among these oxazoline group-containing polymers thus obtained, a polymer having a number average molecular weight of 1000 to 10000 and a glass transition temperature of 40 to 120° C. is preferable. It should be noted that the oxazoline value denotes a polymer weight per 1 mol of oxazoline groups (weight per oxazoline equivalent). In other words, the smaller the oxazoline value is, the larger the amount of oxazoline groups in the polymer is, and the larger the oxazoline value is, the smaller the amount of oxazoline groups in the polymer is.

Examples of the above-mentioned oxazoline-containing resin include water-soluble type resins such as EPOCROS WS-500, WS-700, etc., and emulsion type resins such as EPOCROS K-2010, K-2020, K-2030, etc. (manufactured by Nippon Shokubai Co., Ltd.). The water-soluble type resin is particularly preferred because it is highly reactive with a base compound.

(Low-molecular Weight Polyvalent Oxazoline Compound)

In the case of a low-molecular weight compound, a polyvalent oxazoline compound having two or more oxazoline groups in one molecule, specifically an oligomer is preferred. Preferred examples of the dioxazoline compound having two oxazoline groups in one molecule include those represented by the following general formula (3). In the formula (3), "E" denotes an alkylene group, a cycloalkylene group, or an arylene group. In the formula (3), $R^1$, $R^2$, $R^3$ and $R^4$ each are a hydrogen atom, an alkyl group, or an aryl group. They may be the same or different from each other.

Chemical formula 3:

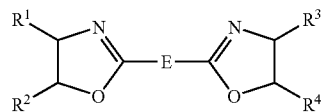

Examples of the alkylene group as "E" in the above-mentioned bisoxazoline compound include C1-10 alkylene groups (such as a methylene, ethylene, trimethylene, propylene, tetramethylene, pentamethylene, and hexamethylene groups). The cycloalkylene groups include, for example, C5-10 cycloalkylene groups (such as 1,3-cyclopentylene, 1,3-cyclohexylene, and 1,4-cyclohexylene groups). The arylene groups include C6-12 arylene groups (such as 1,3-phenylene, 1,4-phenylene, 1,5-naphthylene, and 2,5-naphthylene groups).

These alkylene groups, cycloalkylene groups and arylene groups each may have a substituent. Examples of such a substituent include halogen atoms (such as a fluorine atom, a chlorine atom, and a bromine atom), alkyl groups (having about 1 to 6 carbon atoms, such as methyl, ethyl, propyl, isopropyl, butyl, isobutyl, s-butyl, and t-butyl groups), alkoxy groups (having about 1 to 6 carbon atoms, such as methoxy, ethoxy, propoxy, isopropoxy, and butoxy groups). Preferred examples of "E" include an aryl group that may have a substituent, particularly, a phenylene group that may have a substituent (such as a 1,3-phenylene group and a 1,4-phenylene group).

In the formula (3), examples of the alkyl groups represented by $R^1$, $R^2$, $R^3$ and $R^4$ are C1-10 alkyl groups such as methyl, ethyl, propyl, isopropyl, butyl, isobutyl, s-butyl, t-butyl, pentyl, and hexyl groups. Among those, the preferred alkyl groups are lower alkyl groups having about 1 to 6 carbon atoms, especially lower alkyl groups having about 1 to 4 carbon atoms (for example, a methyl group, an ethyl group, a propyl group, and an isopropyl group). The aryl groups represented by $R^1$, $R^2$, $R^3$ and $R^4$ include phenyl, 1-naphthyl, 2-naphthyl groups, etc., for example.

The above-described alkyl groups and aryl groups each may have a substituent. Examples of the alkyl group having a substituent include, for example, C1-4 alkyl halide groups such as dichloromethyl, trichloromethyl, trifluoromethyl, 2,2,2-trichloroethyl, 2,2,2-trifluoroethyl, and pentafluoroethyl groups. Examples of the aryl group having a substituent include: phenyl groups each having a halogen atom, such as 2-chlorophenyl, 3-chlorophenyl, 4-chlorophenyl, 2,4-dichlorophenyl, and 3,5-dichlorophenyl groups; C1-4 alkyl-phenyl groups such as 2-methylphenyl, 3-methylphenyl, 4-methylphenyl, 2,4-dimethylphenyl, 3,5-dimethylphenyl, and 4-ethylphenyl groups; and C1-4 alkoxy-phenyl groups such as 2-methoxyphenyl, 3-methoxyphenyl, 4-methoxyphenyl, 2,4-dimethoxyphenyl, 3,5-dimethoxyphenyl, and 4-ethoxyphenyl groups.

Specific examples of the dioxazoline compound represented by the above-mentioned general formula (3) include: 1,6-bis(1,3-oxazoline-2-yl)hexane, 1,8-bis(1,3-oxazoline-2-yl)octane, 1,10-bis(1,3-oxazoline-2-yl)decane, 1,3-bis(1,3-oxazoline-2-yl)cyclohexane, 1,4-bis(1,3-oxazoline-2-yl)cyclohexane, 2,2'-(1,3-phenylene)-bis(2-oxazoline), 2,2'-(1,4-phenylene)-bis(2-oxazoline), 2,2'-(1,2-phenylene)-bis(2-oxazoline), 2,2'-(1,3-phenylene)-bis(4-methyl-2-oxazoline), 2,2'-(1,4-phenylene)-bis(4-methyl-2-oxazoline), 2,2'-(1,2-phenylene)-bis(5-methyl-2-oxazoline), 2,2'-(1,3-phenylene)-bis(5-methyl-2-oxazoline), 2,2'-(1,4-phenylene)-bis(5-methyl-2-oxazoline), 2,2'-(1,3-phenylene)-bis(4-methylphenyl-2-oxazoline), 2,2'-(1,4-phenylene)-bis(4-methylphenyl-2-oxazoline), 2,2'-(1,3-phenylene)-bis(4-chlorophenyl-2-oxazoline), and 2,2'-(1,4-phenylene)-bis(4-chlorophenyl-2-oxazoline). One of these dioxazoline compounds can be used independently or two or more of them may be used in combination.

Examples of the other polyvalent oxazoline compounds include trioxazoline compounds having three oxazoline groups in one molecule, such as 2,2'-(1,2,4-phenylene)-tris-(2-oxazoline). Two or more of these trioxazoline compounds may be used in combination.

(Silane Coupling Agent)

In order to improve the water resistance of the bright pigment 100 and the coating film including the same, the surface layer 40 may include a silane coupling agent instead of the oxazoline compound or in combination with the oxazoline compound.

Typical examples of the silane coupling agent include organic silane coupling agents. The silane coupling agent may be selected depending on the resin to be used, but at least one selected from the group consisting of vinylsilane, epoxysilane, methacryloxysilane, aminosilane, isocyanate silane, and mercaptosilane can be used. Furthermore, alkoxysilane or the like, which is not treated as a silane coupling agent, further may be contained in addition to the silane coupling agent.

Examples of the epoxysilane include 2-(3,4-epoxycyclohexyl)ethyltrimethoxysilane, 3-glycidoxy propyltrimethoxysilane, 3-glycidoxy propylmethyldiethoxysilane, and 3-glycidoxy propyltriethoxysilane.

Examples of the methacryloxysilane include 3-methacryloxy propylmethyldimethoxysilane, 3-methacryloxy propyltrimethoxysilane, 3-methacryloxy propylmethyldiethoxysilane, and 3-methacryloxy propyltriethoxysilane.

Examples of the aminosilane include N-2(aminoethy)3-aminopropylmethyldimethoxysilane, N-2(aminoethyl)3-aminopropyltrimethoxysilane, 3-aminopropyltrimethoxysilane, 3-aminopropyltriethoxysilane, 3-triethoxysilyl-N-(1,3-dimethyl-butylidene)propylamine, and N-phenyl-3-aminopropyltrimethoxysilane.

Examples of the isocyanate silane include 2-isocyanate ethyltrimethoxysilane, 2-isocyanate ethyltriethoxysilane, 3-isocyanate propyltrimethoxysilane, and 3-isocyanate propyltriethoxysilane.

Examples of the mercaptosilane include 3-mercapto propyltrimethoxysilane.

Examples of the alkoxysilane which is not treated as a silane coupling agent include trimethylmethoxysilane, trimethylethoxysilane, dimethyldimethoxysilane, dimethyldiethoxysilane, methyltrimethoxysilane, methyltriethoxysilane, methyldimethoxysilane, methyldiethoxysilane, dimethylethoxysilane, dimethylvinylmethoxysilane, dimethylvinylethoxysilane, methylvinyldimethoxysilane, methylvinyldiethoxysilane, diphenyldimethoxysilane, diphenyldiethoxysilane, phenyltrimethoxysilane, phenyltriethoxysilane, tetramethoxysilane, and tetraethoxysilane.

It is preferable that the content of the silane coupling agent in the bright pigment is 0.01 to 1.0 mass %. When the content is less than 0.01 mass %, not much effect on improving the affinity for the paint or the resin can be expected. On the other hand, when the content exceeds 1.0 mass %, a reaction takes place between the coupling agents, which may impair the affinity for the paint or the resin. In addition, the cost increases.

When forming the surface layer 40 using a silane coupling agent and an oxazoline compound, the silane coupling agent may be dispersed in the matrix of the oxazoline compound, or the surface layer 40 may have a layer composed of the silane coupling agent and a layer composed of the oxazoline compound separately. In the latter case, the coupling agent layer and the oxazoline compound layer can be formed in this order. In other words, the silane coupling agent may be interposed between the neodymium-containing layer 30 and the oxazoline compound layer.

For example, after the neodymium-containing layer 30 is formed, a coupling agent (preferably an organic silane coupling agent) layer is formed thereon. The neodymium-containing layer 30 is bonded, through dehydration and condensation, with silanol obtained by hydrolysis of the residue of the organic functional groups of the organic silane coupling agent. Next, the functional group (organic functional group) of the coupling agent is reacted with an appropriate dicarboxylic acid so as to obtain a precursor having a carboxyl group on its top surface. The dicarboxylic acid to be used here is preferably dicarboxylic acid anhydride. Examples thereof include maleic acid anhydride, fumaric acid anhydride, and adipic acid anhydride.

The above-mentioned precursor is coated with an oligomer (or a polymer) having an oxazoline group. The carboxyl group of the precursor reacts with the oxazoline group, and thus a bright pigment having a structure represented by the following general formula (4) is obtained. In the formula (4), "A" denotes a portion including the flaky substrate 10, the titanium dioxide layer 20 and the neodymium-containing layer 30, "B" denotes a silane coupling agent, and the residual portion denotes the oxazoline compound layer. "E" is the same as described above. In this way, the adhesion between the surface layer 40 and the neodymium-containing layer 30 is enhanced. The oxazoline groups that remain unreacted with the functional groups of the silane coupling agent (the right side of the amide-ester bond in the formula (4)) bond with the carboxyl group-containing resin in the paint.

Chemical formula 4:

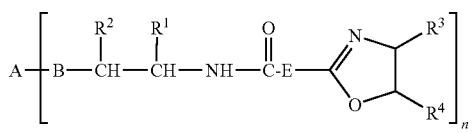

(Resin Composition Containing Bright Pigment)

One example of the resin composition of the present invention includes the bright pigment 100 of the present invention and a carboxyl group-containing resin as a matrix. The resin composition may be in the form of a solution (such as an organic solvent solution and an aqueous solution) or a dispersion liquid (such as an aqueous emulsion). Specific examples of the resin composition include a paint, a coating agent, an ink and an adhesive. The resin composition of the present invention can be used for the purposes of improving the durability of the base material due to the protective effect of the organic resin, preserving the appearance, enhancing the design values, and so forth.

Examples of the carboxyl group-containing resin include carboxyl group-containing acrylic acid polymers such as acrylic acid resins (homopolymers), (meth)acrylic acid copolymers, ethylene-(meth)acrylic acid copolymers, vinyl acetate-(meth)acrylic acid copolymers, (meth)acrylate ester-(meth)acrylic acid copolymers, and styrene-(meth)acrylic acid copolymers. Other examples thereof include synthetic resins such as styrene-butadiene copolymers (styrene-butadiene latex introduced with a carboxyl group, for example), styrene-maleic anhydride copolymers, carboxyl group-containing urethane resins, carboxyl group-containing polyester resins, carboxyl group-containing alkyd resins, and carboxyl group-containing polyvinyl alcohol resins. Still other examples thereof include natural resins such as carboxymethyl cellulose. Furthermore, two-component resins, such as acrylic-modified polyesters, acrylic-modified polyurethanes, and acrylic-modified epoxy resins, also can be used. Hereinafter, carboxyl group-containing acrylic acid polymers and acrylic-modified epoxy resins will be described in detail.

(Carboxyl Group-containing Acrylic Acid Polymer)

Carboxyl group-containing acrylic acid polymers can be obtained by copolymerization of, for example, acrylic acid esters and aromatic vinyls or vinyl esters. The carboxyl group-containing acrylic acid polymer preferably contains 0.2 to 30 mass % of structural units derived from monomers (carboxyl group or its salts), for example, and more preferably 1 to 20 mass %. The acid value of the carboxyl group-containing acrylic acid polymer is preferably 2 to 200 mg.KOH/g, and more preferably 10 to 100 mg.KOH/g.

The weight average molecular weight of the carboxyl group-containing acrylic acid polymer is preferably 1000 to 1000000, more preferably 3000 to 500000, and further preferably 5000 to 100000. The glass transition temperature of the carboxyl group-containing acrylic acid polymer varies in accordance with the intended use of the resin composition, but the temperature of −60 to 50° C. is preferred generally.

In the case where the resin composition is used for a paint, a coating agent, or a printing ink, the resin composition preferably contains a carboxyl group-containing acrylic acid polymer having a glass transition temperature of −10 to 50° C. In the case where the resin composition is used for an adhesive, it preferably contains a carboxyl group-containing acrylic acid polymer having a glass transition temperature of −20 to 30° C.

(Acrylic-modified Epoxy Resin)

In an acrylic-modified epoxy resin, an acrylic vinyl copolymer is introduced to an epoxy resin as a main chain. The carboxyl groups are bonded with the vinyl copolymer.

An acrylic-modified epoxy resin containing carboxyl groups can be obtained by esterification reaction between a vinyl copolymer and an epoxy resin in a hydrophilic organic solvent in the presence of a basic compound. There is no particular limitation on ethylenically unsaturated carboxylic acid monomers that are the source materials of the vinyl copolymer. Examples thereof include acrylic acid, methacrylic acid, maleic acid, fumaric acid, and itaconic acid. Two or more of these may be used in combination. There is no particular limitation on the method of polymerizing these monomer components. For example, they may be polymerized using commonly-used radical polymerization initiator such as azobisisobutyronitrile, and benzoyl peroxide.

The epoxy resin is preferably at least one selected from a group consisting of a bisphenol F type epoxy resin, a bisphenol A type epoxy resin, and a hydrogenated bisphenol A type epoxy resin. In addition, the epoxy resin preferably has an average of 1.1 to 2.0 epoxy groups in one molecule, as well as a number average molecular weight of 900 or more.

The weight average molecular weight of the acrylic-modified epoxy resin is preferably 2000 to 100000, for example. The acrylic-modified epoxy resin having a weight average molecular weight of 2000 to 100000 has excellent emulsification dispersion performance, and thus the gelation thereof is not likely to occur during the reaction between the acrylic vinyl copolymer and the epoxy resin.

The resin composition may be in the form of a solution (such as an organic solvent solution and an aqueous solution) or a dispersion liquid (such as an aqueous emulsion) in accordance with the intended use thereof. Examples of an organic solvent suitably used in the organic solvent solution of the carboxyl group-containing resin include: alcohols (such as methanol, ethanol, propanol, isopropanol, and n-butanol); aliphatic hydrocarbons (such as hexane, heptane, and octane); alicyclic hydrocarbons (such as cyclohexane); aromatic hydrocarbons (such as benzene, toluene, and xylene); esters (such as ethyl acetate, n-butyl acetate, isobutyl acetate, and n-butyl acetate); ketones (such as acetone, methyl ethyl ketone, and methyl isobutyl ketone); ethers (such as diethyl ether, dioxane, and tetrahydrofuran); cellosolves (such as methyl cellosolve (ethylene glycol monomethyl ether), ethyl cellosolve, propyl cellosolve, butyl cellosolve, phenyl cellosolve, and benzyl cellosolve); and carbitols (such as diethylene glycol monomethyl ether, carbitol (diethylene glycol monoethyl ether), and diethylene glycol monopropyl ether). A mixed solvent thereof also can be used.

An aqueous solution of the resin composition can be obtained by dissolving, for example, a carboxyl group-containing acrylic resin in water using an alkali. Examples of the alkali include: organic bases such as aliphatic amines (e.g., trimethylamine, triethylamine, ethylenediamine); alkanolamines such as ethanolamine, diethanolamine, dimethylethanolamine, triethanolamine; heterocyclic amines such as morpholine; ammonia; and inorganic bases such as alkali metal compounds (e.g., sodium hydroxide, and potassium hydroxide). Among these, ammonia, diethanolamine, dimethylethanolamine, and triethanolamine are preferred.

It is desirable that the acidic group (e.g., a carboxyl group) contained in the resin as a matrix be neutralized by a base to the extent that the resin as a matrix (e.g., carboxyl group-containing acrylic acid polymer) can be dispersed in water. The percentage of the acidic groups to be neutralized is desirably about 50% of all the acidic groups. For example, when the total number of moles of the acidic groups contained in the resin as a matrix is 1, the number of moles of the amine to be used suitably for the neutralization of the acidic groups is 0.4 to 2.0 times, preferably 0.6 to 1.4 times.

The aqueous emulsion can be prepared by a commonly-used method. For example, a method in which the carboxyl group-containing acrylic acid polymer is dispersed by neutralizing a portion of the carboxyl groups in the carboxyl group-containing acrylic acid polymer by a base can be mentioned. The aqueous emulsion may be prepared by an emulsion polymerization method. For the emulsion polymerization, commonly-used emulsifying agents (for example, anionic surfactants, nonionic surfactants, and protective colloids such as polyvinyl alcohols and water-soluble polymers). The pH of the aqueous emulsion may be adjusted using a pH adjuster.

There is no particular limitation on the concentration (solid content concentration) of the resin as a matrix in the resin composition, but for example, it is preferably 10 to 70 mass %, and more preferably 25 to 50 mass %.

(Crosslinking Curing Agent)

The resin composition, paint, coating agent, and printing ink each containing the bright pigment of the present invention further may contain a crosslinking curing agent. As a crosslinking curing agent, amino resin and/or polyisocyanate can be used. In the case where the resin as a matrix of the paint or the coating agent has a hydroxyl group, this hydroxyl group reacts with a crosslinking agent such as an amino resin and a polyisocyanate compound, thereby curing the resin. The amino resin and/or the polyisocyanate compound also reacts and crosslinks with a carboxyl group, an amino group, and the like having an active hydrogen other than the hydroxyl group.

Examples of the amino resin (crosslinking curing agent) include melamine resins such as alkyl-etherified melamine resins, benzoguanamine resins such as alkyletherified benzoguanamine resins, and urea resins such as alkyletherified urea resins. Among these, melamine resins are preferred. Specific examples of the melamine resins include dimethylol melamine, trimethylol melamine, tetramethylol melamine, pentamethylol melamine, and hexamethylol melamine. Furthermore, the amino resins may be these alkyl-etherified melamine resins (e.g., methyl ether, ethyl ether, propyl ether, isopropyl ether, butyl ether, isobutyl ether, etc.), urea-formamide condensates, or urea-melamine condensates. Two or more of these amino resins may be used in combination.

The content of the amino resin is set so that the mass ratio between the resin as a matrix (solid content) and the amino resin (solid content) is preferably 95/5 to 60/40, more preferably 85/15 to 65/35. Such setting allows the coating film formed by applying the paint and the coating layer obtained by applying the coating agent to have high strength as well as high corrosion resistance.

As a polyisocyanate compound (crosslinking curing agent), for example, a blocked polyisocyanate compound in which the isocyanate groups in polyisocyanate are masked with a blocking agent is suitable. Examples of the polyisocyanate include HDIs (such as hexamethylene diisocyanate), TDIs (such as tolylene diisocyanate), XDIs (such as xylylene diisocyanate), and MDIs (such as diphenylmethylene diisocyanate). Examples of the blocking agent include oxime and lactam.

In the case where the above-mentioned polyisocyanate compound is a blocked polyisocyanate compound, the content of the polyisocyanate compound may be set so that the molar ratio (the number of moles of hydroxyl groups/the number of moles of regenerated isocyanate groups) between the hydroxyl groups contained in the resin as a matrix and the deblocked and regenerated isocyanate groups contained in the polyisocyanate compound is 100/20 to 100/150.

(Coating Application Method)

The resin composition of the present invention can be used for a paint, a coating agent, a printing ink, or an adhesive. After being applied to a body to be coated, these each are then heated and dried, if necessary, thereby forming a coating film, a coating layer or an adhesive layer. There is no particular limitation on the application method or coating method. Examples of the method include commonly used methods such as spray coating, roll coating, knife coating, bar coater coating, dip coating, and brush coating. The thickness of the coating film or the coating layer varies depending on the type of the body to be coated. The thickness thereof is, for example, preferably 0.1 to 1000 μm, more preferably 0.2 to 500 μm, and further preferably 0.3 to 300 μm. The thickness of the adhesive layer varies depending on the type of the body to be coated. The thickness thereof is, for example, preferably 1 to 10000 μm, more preferably 5 to 5000 μm, and further preferably 10 to 3000 μm.

The temperature of the atmosphere in which the paint is dried or cured is, for example, preferably 10 to 200° C., more preferably 20 to 150° C., and further preferably 50 to 120° C.

An example of the resin composition of the present invention can be prepared by mixing the bright pigment of the present invention and an acrylic resin. The resin composition may be in powder form, but commonly it is in the form of a solution or a dispersion liquid (emulsion) containing an organic solvent or containing water as a solvent in many cases. A preferred resin composition usually contains an organic solvent, and such a resin composition is useful as a coating agent or an adhesive.

The resin composition can be prepared by a commonly-used method. For example, it can be prepared using a mixing disperser. The bright pigment and additives (such as a filler) may be dispersed, if necessary, with a dispersant by a disperser (such as a ball mill and an ultrasonic disperser).

The ratio of the bright pigment to be used can be selected, for example, from a range of approximately 0.1 to 120 parts by mass preferably from a range of approximately 0.5 to 100 parts by mass (1 to 50 parts by mass, for example) in terms of the solid content with respect to 100 parts by mass of the acrylic resin, although not always appropriate because it depends on the molecular weight of the compound having an oxazoline group, the amount of the oxazoline group to be introduced thereto, the amount of the organic functional group to be introduced into the silane coupling agent, the molecular weight and acid value of the acrylic resin, and so forth.

Various additives may be added to the resin composition depending on the intended use. Examples thereof include other thermoplastic resins (such as acrylic resin and polyester resin containing no carboxyl group), thermosetting resins (such as urethane resin and amino resin), antioxidants, ultraviolet absorbers, stabilizers such as heat stabilizers, plasticizers, antistatic agents, dispersants, antiskinning agents, viscosity modifiers such as thickeners, planarizers, anti-dripping agents, mildew proofing agents, preservatives, fillers, and coloring pigments.

A coating film formed of the resin composition that contains the bright pigment 100 and a carboxyl group-containing resin (such as an acrylic resin) has high hardness as well as excellent abrasion resistance and solvent resistance. The coating film thus formed also improves its chemical resistance and adhesion to the base material or the body to be coated. Accordingly, the above-mentioned resin composition is useful for a paint, a coating agent and an adhesive.

The paint containing the bright pigment 100 can be applied to a base material as follows. First, a base-coat paint (A) containing a white pigment is applied to a base material, thereby forming a first coating film for shielding the surface of the base material. The base material may be a metal plate that has been subjected to base treatment such as zinc phosphate chemical conversion treatment, or may be a resin molded product. The first coating film, for example, has a lightness of 6 to 9.5 in the Munsell color system. After drying of the first coating film, a base-coat paint (B) containing the bright pigment 100 is applied onto the first coating film, thereby forming a second coating film. In this way, a coated product in which the first coating film and the second coating film with brightness are formed on the base material is obtained. Other coating films than the first coating film and the second coating film may be formed thereon, as needed.

It is preferable that the content of the bright pigment 100 in the paint is adjusted so that it falls within the range of 0.1 to 30 mass % in the coating film (the second coating layer in the above-mentioned example) after drying and curing. More preferably, the content thereof is 1 to 20 mass %. When the content of the bright pigment 100 is less than 0.1 mass %, not much effect on improving the brightness of the coating film can be expected. On the other hand, when the content thereof is more than 30 mass %, the brightness is not improved so much in spite of such a high content. Instead, the color tone of the body may be decreased.

The bright pigment 100 is not likely to decrease the color tone of the base and therefore can be used for paints of various colors. For example, the bright pigment 100 can be used not only for primary colors such as red, blue, green and black but also other colors, such as pastel colors, for which it is hard to adjust the color tones. In the case where the bright pigment 100 is blended in an ink, it is preferable to use the bright pigment 100 including flaky glass having an average thickness of 0.1 to 2 μm and an average particle size of 120 μm or less as the substrates 10. When the average thickness is 2 μm or more, the brush strokes have an appearance such that the bright pigment particles stand out, and thus the smoothness of the brush strokes may decrease. The smoothness of the brush strokes may decrease also when the average particle size exceeds 120 μm. Furthermore, in the case of being blended in gravure inks or offset inks, which are required to have good printability, the average particle size is preferably 50 μm or less.

EXAMPLES

Hereinafter, the present invention will be described further in detail by way of Examples and Comparative Examples. The present invention, however, is not limited to the following Examples as long as the scope of the present invention is not exceeded.

The average particle size of the bright pigment was measured with a laser diffraction scattering particle size analyzer (particle size distribution meter, Microtrac HRA (X-100)). As a measurement condition, a transparent mode was employed in Examples 1 to 14, and Comparative Examples 1 to 4 and 6, and a reflective mode was employed in Examples 15 to 22 and Comparative Example 5. Thus, an average particle size ($D_{50}$) corresponding to a cumulative volume of 50% in the particle size distribution was measured. The average thickness of the bright pigment particles was obtained by measuring the thicknesses of the end faces of 50 particles with an electron microscope and averaging the measured values. The content of each of the hydroxides or hydrated oxides of metals such as neodymium was measured with an inductively coupled plasma (ICP: Inductively Coupled Plasma, ICPS-7510, manufactured by SHIMADZU CORPORATION) technique after totally dissolving each sample thereof. The content of titanium dioxide was determined by measuring the difference in weight before and after the coating. The content of aluminum was measured with a secondary ion-microprobe mass spectrometer (SIMS) (IMS-6F, manufactured by Cameca). Specifically, the contents thereof were determined based on the distribution of the components from the surface of the bright pigment to the surface of the flaky glass substrate. The contents of the compound having an oxazoline group (a polymer or an oligomer) and the coupling agent were determined based on the difference in ignition loss before and after heating at 400° C. for 1 hour using a heating/baking furnace. In the following Examples and Comparative Examples, a content is referred to as a deposition amount.

In Examples 1 to 7, METASHINE (registered trademark) MC1020RS manufactured by Nippon Sheet Glass Co., Ltd. was used as a bright pigment coated with rutile-type titanium dioxide. This bright pigment has an average particle size of 20 μm, an average thickness of 1.6 μm, and a deposition amount of rutile-type titanium dioxide of approximately 7 mass %, and exhibits white luster with yellow turbidity due to the complementary color.

Example 1

Example 1 is a bright pigment in which each coating layer of rutile-type titanium dioxide, the hydroxide or hydrated oxide of neodymium and an oxazoline group-containing polymer is formed on flaky glass in this order.

First, a 4 mass % aqueous solution of neodymium nitrate was prepared using 1.2 g of neodymium (III) nitrate hexahydrate [$Nd(NO_3)_3 \cdot 6H_2O$]. About 50 g of a commercially available bright pigment (MC1020RS) was suspended in 0.5 liter (L) of purified water and kept at 75° C. in a water bath, and the pH of the suspension was adjusted to pH 6 with diluted nitric acid. Subsequently, the neodymium nitrate solution and 4.0 g of a 1N aqueous solution of sodium hydroxide were added slowly to the suspension over a period of 10 minutes. After the addition, the resulting suspension was stirred at 75° C. for 30 minutes while keeping it at pH 6. Subsequently, the suspension was filtered with filter paper to obtain a filtered solid. The filtered solid was washed with water. Thus, a bright pigment coated with the hydroxide or hydrated oxide of neodymium was obtained.

Furthermore, 2.0 g of an oxazoline group-containing polymer (EPOCROS WS-700 manufactured by Nippon Shokubai, Co., Ltd., resin solid content: 25 mass %, oxazoline value: 220 g/eq) was prepared, added to 0.5 L of ion-exchanged water, and stirred. Thus, a treatment liquid was obtained. Thereafter, about 50 g of the bright pigment coated with the hydroxide or hydrated oxide of neodymium was added to the treatment liquid and stirred for 30 minutes. Then, the suspension was filtered with filter paper to obtain a filtered solid. The filtered solid was dried at 120° C. for 2 hours. In this case, the amount of the oxazoline group-containing polymer added was 1 mass % in terms of the resin solid content. Thus, the bright pigment of Example 1 was obtained.

As a result of an analysis, in the bright pigment thus obtained, the deposition amount of the hydroxide or hydrated oxide of neodymium was about 0.4 mass % in terms of the neodymium, and the deposition amount of the oxazoline group-containing polymer was 0.5 mass %. In this case, the deposition amount of the neodymium was equivalent to approximately 4.8 mass % of the rutile-type titanium dioxide.

Example 2

Example 2 is a bright pigment in which each coating layer of rutile-type titanium dioxide, the hydroxide or hydrated oxide of neodymium and an oxazoline group-containing polymer/organic silane coupling agent is formed on flaky glass in this order. It should be noted that the expression of "an oxazoline group-containing polymer/silane coupling agent" means a coating layer (simultaneous coating) including an oxazoline group-containing polymer and a silane coupling agent.

As an organic silane coupling agent, 0.5 g of 3-methacryloxy propyltriethoxysilane (A-174 manufactured by Nippon Unicar Co., Ltd.) was prepared, added to 0.5 L of ion-exchanged water, and stirred for hydrolysis thereof. 2 g of an oxazoline group-containing polymer (EPOCROS WS-700 manufactured by Nippon Shokubai, Co., Ltd., resin solid content: 25 mass %, oxazoline value: 220 g/eq) was prepared, and added to the hydrolysis solution of the silane coupling agent.

Thereafter, about 50 g of the bright pigment of Example 1 was added to the hydrolysis solution and stirred for 30 minutes. Then, the suspension was filtered with filter paper to obtain a filtered solid. The filtered solid was dried at 120° C. for 2 hours. Thus, the bright pigment of Example 2 was obtained.

As a result of an analysis, in the bright pigment thus obtained, the deposition amount of the hydroxide or hydrated oxide of neodymium was about 0.4 mass % in terms of the neodymium, and the total deposition amount of the oxazoline group-containing polymer and the organic silane coupling agent was 0.6 mass %. In this case, the deposition amount of the neodymium was equivalent to approximately 4.8 mass % of the rutile-type titanium dioxide.

Example 3

Example 3 is a bright pigment in which each coating layer of rutile-type titanium dioxide, hydroxides or hydrated oxides of neodymium and aluminum and an oxazoline group-containing polymer is formed on flaky glass in this order.

As an aluminum compound, a 2 mass % aqueous solution of aluminum chloride was prepared using 0.3 g of aluminum chloride hexahydrate. Further, the solution containing aluminum chloride, an aqueous solution of neodymium nitrate (4 mass %) and 9.0 g of a 1N aqueous solution of sodium hydroxide were added simultaneously to the suspension in the same manner as in Example 1. The obtained filtered solid was washed and dried. Thus, a bright pigment coated with hydroxides or hydrated oxides of neodymium and aluminum was obtained.

Meanwhile, 2.0 g of an oxazoline group-containing polymer (EPOCROS WS-700 manufactured by Nippon Shokubai, Co., Ltd., resin solid content: 25 mass %, oxazoline value: 220 g/eq) was prepared, added to 0.5 L of ion-exchanged water, and stirred in the same manner as in Example 1. Thus, a treatment liquid was obtained.

Thereafter, 50 g of the bright pigment coated with the above-mentioned hydroxides or hydrated oxides of neodymium and aluminum was added to the above-mentioned treatment liquid to prepare a suspension, and stirred for 30 minutes. Then, the suspension was filtered with filter paper to obtain a filtered solid. The filtered solid was dried at 120° C. for 2 hours. Thus, the bright pigment of Example 3 was obtained.

As a result of an analysis, in the bright pigment thus obtained, the deposition amount of the hydroxide or hydrated oxide of neodymium was about 0.4 mass % in terms of the neodymium, the deposition amount of the hydroxide or hydrated oxide of aluminum was about 0.15 mass % in terms of the aluminum, and the deposition amount of the oxazoline group-containing polymer was 0.5 mass %. In this case, the deposition amount of the neodymium was equivalent to approximately 4.8 mass % of the rutile-type titanium dioxide. Furthermore, the deposition amount of the aluminum was equivalent to approximately 1.8 mass % of the rutile-type titanium dioxide. Accordingly, the total deposition amount of the neodymium and aluminum was equivalent to approximately 6.6 mass % of the rutile-type titanium dioxide.

Example 4

Example 4 is a bright pigment coated with an organic silane coupling agent instead of an oxazoline group-containing polymer in Example 3. Specifically, Example 4 is a bright pigment in which each coating layer of rutile-type titanium dioxide, hydroxides or hydrated oxides of neodymium and aluminum, and an organic silane coupling agent is formed on flaky glass in this order.

As an organic silane coupling agent, 0.5 g of 3-methacryloxy propyltriethoxysilane (A-174, manufactured by Nippon Unicar Co., Ltd.) was prepared, added to 0.5 L of ion-exchanged water, and stirred for hydrolysis thereof.

Thereafter, in the same manner as in Example 3, about 50 g of the bright pigment simultaneously coated with hydroxides or hydrated oxides of neodymium and aluminum was added to the hydrolysis solution and stirred for 30 minutes. Then, the suspension was filtered with filter paper to obtain a filtered solid. The filtered solid was dried at 120° C. for 2 hours. Thus, the bright pigment of Example 4 was obtained.

As a result of an analysis, in the bright pigment thus obtained, the deposition amount of the hydroxide or hydrated oxide of neodymium was about 0.4 mass % in terms of the neodymium, the deposition amount of the hydroxide or hydrated oxide of aluminum was about 0.15 mass % in terms of the aluminum, and the deposition amount of the organic silane coupling agent was 0.1 mass %. In this case, the deposition amount of the neodymium was equivalent to approximately 4.8 mass % of the rutile-type titanium dioxide. Furthermore, the deposition amount of the aluminum was equivalent to approximately 1.8 mass % of the rutile-type titanium dioxide. Accordingly, the total deposition amount of the neodymium and aluminum was equivalent to approximately 6.6 mass % of the rutile-type titanium dioxide.

Example 5

Example 5 is a bright pigment coated with the hydroxide or hydrated oxide of lanthanum instead of the hydroxide or hydrated oxide of aluminum in Example 3. Specifically, Example 5 is a bright pigment in which each coating layer of rutile-type titanium dioxide, the hydroxide or hydrated oxide of lanthanum, the hydroxide or hydrated oxide of neodymium and an oxazoline group-containing polymer is formed on flaky glass in this order.

The hydroxide or hydrated oxide of lanthanum was formed in the following manner. First, a 2 mass % aqueous solution of lanthanum nitrate was prepared using 0.6 g of lanthanum (III) nitrate hexahydrate [$La(NO_3)_3 \cdot 6H_2O$]. About 50 g of the bright pigment (MC1020RS) was suspended in 0.5 L of purified water and kept at 75° C. in a water bath, and the pH of the suspension was adjusted to pH 6 with diluted nitric acid. The lanthanum nitrate solution and 2.0 g of a 1N aqueous solution of sodium hydroxide were added slowly to the suspension over a period of 10 minutes. After the addition, the resulting suspension was stirred at 75° C. for 30 minutes while keeping it at pH 6. Subsequently, the suspension was filtered with filter paper to obtain a filtered solid. The filtered solid was washed with water. Thus, a bright pigment coated with the hydroxide or hydrated oxide of lanthanum was obtained.

Thereafter, the treatment with the hydroxide or hydrated oxide of neodymium and the oxazoline group-containing polymer was performed thereon in the same manner as in Example 1. Thus, the bright pigment of Example 5 was obtained.

As a result of an analysis, in the bright pigment thus obtained, the deposition amount of the hydroxide or hydrated oxide of lanthanum was about 0.2 mass % in terms of the lanthanum, the deposition amount of the hydroxide or hydrated oxide of neodymium was about 0.4 mass % in terms of the neodymium, and the deposition amount of the oxazoline group-containing polymer was 0.5 mass %. In this case, the deposition amount of the lanthanum was equivalent to approximately 2.4 mass % of the rutile-type titanium dioxide. The deposition amount of the neodymium was equivalent to approximately 4.8 mass % of the rutile-type titanium dioxide. Accordingly, the total deposition amount of the lanthanum and neodymium was equivalent to approximately 7.2 mass % of the rutile-type titanium dioxide.

Example 6

Example 6 is a bright pigment coated with an organic silane coupling agent instead of an oxazoline group-containing polymer in Example 5. Specifically, Example 6 is a bright pigment in which each coating layer of rutile-type titanium dioxide, the hydroxide or hydrated oxide of lanthanum, the hydroxide or hydrated oxide of neodymium, and an organic silane coupling agent is formed on flaky glass in this order.

As an organic silane coupling agent, 0.5 g of 3-methacryloxy propyltriethoxysilane (A-174, manufactured by Nippon Unicar Co., Ltd.) was prepared, added to 0.5 L of ion-exchanged water, and stirred for hydrolysis thereof.

Thereafter, in the same manner as in Example 4, about 50 g of the bright pigment subsequently coated with the hydroxide or hydrated oxide of lanthanum, the hydroxide or hydrated oxide of neodymium in this order was added to the hydrolysis solution and stirred for 30 minutes. Then, the suspension was filtered with filter paper to obtain a filtered solid. The filtered solid was dried at 120° C. for 2 hours. Thus, the bright pigment of Example 6 was obtained.

As a result of an analysis, in the bright pigment thus obtained, the deposition amount of the hydroxide or hydrated oxide of lanthanum was about 0.2 mass % in terms of the lanthanum, the deposition amount of the hydroxide or hydrated oxide of neodymium was about 0.4 mass % in terms of the neodymium, and the deposition amount of the organic silane coupling agent was 0.1 mass %. In this case, the deposition amount of the lanthanum was equivalent to approximately 2.4 mass % of the rutile-type titanium dioxide. Furthermore, the deposition amount of the neodymium was equivalent to approximately 4.8 mass % of the rutile-type titanium dioxide. Accordingly, the total deposition amount of the lanthanum and neodymium was equivalent to approximately 7.2 mass % of the rutile-type titanium dioxide.

Example 7

Example 7 is a bright pigment further coated with the hydroxide or hydrated oxide of cerium in addition to the coating layers of Example 6. Specifically, Example 7 is a bright pigment in which each coating layer of rutile-type titanium dioxide, the hydroxide or hydrated oxide of lanthanum, the hydroxide or hydrated oxide of cerium, the hydroxide or hydrated oxide of neodymium, and an oxazoline group-containing polymer is formed on flaky glass in this order.

A commercially available bright pigment (MC1020RS) was coated with the hydroxide or hydrated oxide of lanthanum in the same manner as in Example 6. A 1 mass % aqueous solution of cerium (III) nitrate hexahydrate and 4.0 g of a 1N aqueous solution of sodium hydroxide were added slowly to the suspension including the bright pigment coated with the hydroxide or hydrated oxide of lanthanum over a period of 10 minutes. After the addition, the reaction was continued for 10 minutes while keeping the resulting suspension at pH 6.

Thereafter, the treatment with the hydroxide or hydrated oxide of neodymium and the oxazoline group-containing polymer was performed thereon in the same manner as in Example 6. Thus, the bright pigment of Example 7 was obtained.

As a result of an analysis, in the bright pigment thus obtained, the deposition amount of the hydroxide or hydrated oxide of lanthanum was about 0.2 mass % in terms of the lanthanum, the deposition amount of the hydroxide or hydrated oxide of cerium was about 0.1 mass % in terms of the cerium, the deposition amount of the hydroxide or hydrated oxide of neodymium was about 0.4 mass % in terms of the neodymium, and the deposition amount of the oxazoline group-containing polymer was 0.5 mass %. In this case, the deposition amount of the lanthanum was equivalent to approximately 2.4 mass % of the rutile-type titanium dioxide. Further, the deposition amount of the cerium was equivalent to approximately 1.2 mass % of the rutile-type titanium dioxide. Furthermore, the deposition amount of the neodymium was equivalent to approximately 4.8 mass % of the rutile-type titanium dioxide. Accordingly, the total deposition amount of the lanthanum and cerium was equivalent to approximately 8.4 mass % of the rutile-type titanium dioxide.

In Example 8 to Example 14, METASHINE (registered trademark) MC1020RB manufactured by Nippon Sheet Glass Co., Ltd. was used as the bright pigment coated with rutile-type titanium dioxide. This bright pigment has an average particle size of 20 μm, an average thickness of 1.6 μm, and a deposition amount of rutile-type titanium dioxide of approximately 26 mass %, and exhibits blue interference with yellow turbidity.

Example 8

Example 8 is a bright pigment in which each coating layer of rutile-type titanium dioxide, the hydroxide or hydrated oxide of neodymium and an oxazoline group-containing polymer is formed on flaky glass in this order.

First, a 4 mass % aqueous solution of neodymium nitrate was prepared using 2.4 g of neodymium (III) nitrate hexahydrate [$Nd(NO_3)_3 \cdot 6H_2O$]. About 50 g of a commercially available bright pigment (MC1020RB) was suspended in 0.5 liter (L) of purified water and kept at 75° C. in a water bath, and the pH of the suspension was adjusted to pH 6 with diluted nitric acid. Subsequently, the neodymium nitrate solution and 8.0 g of a 1N aqueous solution of sodium hydroxide were added slowly to the suspension over a period of 10 minutes. After the addition, the resulting suspension was stirred at 75° C. for 30 minutes while keeping it at pH 6. Subsequently, the suspension was filtered with filter paper to obtain a filtered solid. The filtered solid was washed with water. Thus, a bright pigment coated with the hydroxide or hydrated oxide of neodymium was obtained.

Furthermore, 2.0 g of an oxazoline group-containing polymer (EPOCROS WS-700 manufactured by Nippon Shokubai, Co., Ltd., resin solid content: 25 mass %, oxazoline value: 220 g/eq) was prepared, added to 0.5 L of ion-exchanged water, and stirred. Thus, a treatment liquid was obtained. Thereafter, about 50 g of the bright pigment coated with the hydroxide or hydrated oxide of neodymium was added to the treatment liquid and stirred for 30 minutes. Then, the suspension was filtered with filter paper to obtain a filtered solid. The filtered solid was dried at 120° C. for 2 hours. Thus, the bright pigment of Example 8 was obtained.

As a result of an analysis, in the bright pigment thus obtained, the deposition amount of the hydroxide or hydrated oxide of neodymium was about 0.8 mass % in terms of the neodymium, and the deposition amount of the oxazoline group-containing polymer was 0.5 mass %. In this case, the deposition amount of the neodymium was equivalent to approximately 3.2 mass % of the rutile-type titanium dioxide.

Example 9

Example 9 is a bright pigment in which each coating layer of rutile-type titanium dioxide, the hydroxide or hydrated oxide of neodymium and an oxazoline group-containing polymer/organic silane coupling agent is formed on flaky glass in this order.

As an organic silane coupling agent, 0.5 g of 3-methacryloxy propyltriethoxysilane (A-174 manufactured by Nippon Unicar Co., Ltd.) was prepared, added to 0.5 L of ion-exchanged water, and stirred for hydrolysis thereof. 2 g of an oxazoline group-containing polymer (EPOCROS WS-700 manufactured by Nippon Shokubai, Co., Ltd., resin solid content: 25 mass %, oxazoline value: 220 g/eq) was prepared, and added to the hydrolysis solution of the silane coupling agent.

Thereafter, about 50 g of the bright pigment coated with the hydroxide or hydrated oxide of neodymium was added to the hydrolysis solution and stirred for 30 minutes. Then, the suspension was filtered with filter paper to obtain a filtered solid. The filtered solid was dried at 120° C. for 2 hours. Thus, the bright pigment of Example 9 was obtained.

As a result of an analysis, in the bright pigment thus obtained, the deposition amount of the hydroxide or hydrated oxide of neodymium was about 0.8 mass % in terms of the neodymium, and the total deposition amount of the oxazoline group-containing polymer and the organic silane coupling agent was 0.6 mass %. In this case, the deposition amount of the neodymium was equivalent to approximately 3.2 mass % of the rutile-type titanium dioxide.

Example 10

Example 10 is a bright pigment in which each coating layer of rutile-type titanium dioxide, hydroxides or hydrated oxides of neodymium and aluminum and an oxazoline group-containing polymer is formed on flaky glass in this order.

As an aluminum compound, a 2 mass % aqueous solution of aluminum chloride was prepared using 0.6 g of aluminum chloride hexahydrate. Further, the solution containing aluminum chloride, an aqueous solution of neodymium nitrate (4 mass %) and 18.0 g of a 1N aqueous solution of sodium hydroxide were added simultaneously to the suspension in the same manner as in Example 1. The obtained filtered solid was washed and dried. Thus, a bright pigment coated with hydroxides or hydrated oxides of neodymium and aluminum was obtained.

Meanwhile, 2.0 g of an oxazoline group-containing polymer (EPOCROS WS-700 manufactured by Nippon Shokubai, Co., Ltd., resin solid content: 25 mass %, oxazoline value: 220 g/eq) was prepared, added to 0.5 L of ion-exchanged water, and stirred in the same manner as in Example 8. Thus, a treatment liquid was obtained.

Thereafter, 50 g of the bright pigment coated with the hydroxides or hydrated oxides of neodymium and aluminum was added to the above-mentioned treatment liquid to prepare a suspension, and stirred for 30 minutes. Then, the suspension was filtered with filter paper to obtain a filtered solid. The filtered solid was dried at 120° C. for 2 hours. Thus, the bright pigment of Example 10 was obtained.

As a result of an analysis, in the bright pigment thus obtained, the deposition amount of the hydroxide or hydrated oxide of neodymium was about 0.8 mass % in terms of the neodymium, the deposition amount of the hydroxide or hydrated oxide of aluminum was about 0.3 mass % in terms of the aluminum, and the deposition amount of the oxazoline group-containing polymer was 0.5 mass %. In this case, the deposition amount of the neodymium was equivalent to approximately 3.2 mass % of the rutile-type titanium dioxide. Furthermore, the deposition amount of the aluminum was equivalent to approximately 1.2 mass % of the rutile-type titanium dioxide. Accordingly, the total deposition amount of the neodymium and aluminum was equivalent to approximately 4.4 mass % of the rutile-type titanium dioxide.

Example 11

Example 11 is a bright pigment coated with an organic silane coupling agent instead of an oxazoline group-containing polymer in Example 10. Specifically, Example 11 is a bright pigment in which each coating layer of rutile-type titanium dioxide, hydroxides or hydrated oxides of neodymium and aluminum and an organic silane coupling agent is formed on flaky glass in this order.

As an organic silane coupling agent, 0.5 g of 3-methacryloxy propyltriethoxysilane (A-174 manufactured by Nippon Unicar Co., Ltd.) was prepared, added to 0.5 L of ion-exchanged water, and stirred for hydrolysis thereof.

Thereafter, in the same manner as in Example 10, about 50 g of the bright pigment simultaneously coated with hydroxides or hydrated oxides of neodymium and aluminum was added to the hydrolysis solution and stirred for 30 minutes. Then, the suspension was filtered with filter paper to obtain a filtered solid. The filtered solid was dried at 120° C. for 2 hours. Thus, the bright pigment of Example 11 was obtained.

As a result of an analysis, in the bright pigment thus obtained, the deposition amount of the hydroxide or hydrated oxide of neodymium was about 0.8 mass % in terms of the neodymium, the deposition amount of the hydroxide or hydrated oxide of aluminum was about 0.3 mass % in terms of aluminum, and the deposition amount of the organic silane coupling agent was 0.1 mass %. In this case, the deposition amount of the neodymium was equivalent to approximately 3.2 mass % of the rutile-type titanium dioxide. Furthermore, the deposition amount of the aluminum was equivalent to approximately 1.2 mass % of the rutile-type titanium dioxide. Accordingly, the total deposition amount of the neodymium and aluminum was equivalent to approximately 4.4 mass % of the rutile-type titanium dioxide.

Example 12

Example 12 is a bright pigment coated with the hydroxide or hydrated oxide of lanthanum instead of the hydroxide or hydrated oxide of aluminum in Example 10. Specifically, Example 12 is a bright pigment in which each coating layer of rutile-type titanium dioxide, the hydroxide or hydrated oxide of lanthanum, the hydroxide or hydrated oxide of neodymium, and an oxazoline group-containing polymer is formed on flaky glass in this order.

The hydroxide or hydrated oxide of lanthanum was formed in the following manner. First, a 2 mass % aqueous solution of lanthanum nitrate was prepared using 1.2 g of lanthanum (III) nitrate hexahydrate [$La(NO_3)_3 \cdot 6H_2O$]. About 50 g of a commercially available bright pigment (MC1020RB) was suspended in 0.5 L of purified water and kept at 75° C. in a water bath, and the pH of the suspension was adjusted to pH 6 with diluted nitric acid. The lanthanum nitrate solution thus prepared and 4.0 g of a 1N aqueous solution of sodium hydroxide were added slowly to the suspension over a period of 10 minutes. After the addition, the resulting suspension was stirred at 75° C. for 30 minutes while keeping it at pH 6. Subsequently, the suspension was filtered with filter paper to obtain a filtered solid. The filtered solid was washed with water. Thus, a bright pigment coated with the hydroxide or hydrated oxide of lanthanum was obtained.

Subsequently, the treatment with the hydroxide or hydrated oxide of neodymium and the oxazoline group-containing polymer was performed thereon in the same manner as in Example 8. Thus, the bright pigment of Example 12 was obtained.

As a result of an analysis, in the bright pigment thus obtained, the deposition amount of the hydroxide or hydrated oxide of lanthanum was about 0.4 mass % in terms of the lanthanum, the deposition amount of the hydroxide or hydrated oxide of neodymium was about 0.8 mass % in terms of the neodymium, and the deposition amount of the oxazoline group-containing polymer was 0.5 mass %. In this case, the deposition amount of the lanthanum was equivalent to approximately 1.6 mass % of the rutile-type titanium dioxide. Furthermore, the deposition amount of the neodymium was equivalent to approximately 3.2 mass % of the rutile-type titanium dioxide. Accordingly, the total deposition amount of the lanthanum and neodymium was equivalent to approximately 4.8 mass % of the rutile-type titanium dioxide.

Example 13

Example 13 is a bright pigment coated with an organic silane coupling agent instead of an oxazoline group-containing polymer in Example 12. Specifically, Example 13 is a bright pigment in which each coating layer of rutile-type titanium dioxide, the hydroxide or hydrated oxide of lanthanum, the hydroxide or hydrated oxide of neodymium, and an organic silane coupling agent is formed on flaky glass in this order.

As an organic silane coupling agent, 0.5 g of 3-methacryloxy propyltriethoxysilane (A-174, manufactured by Nippon Unicar Co., Ltd.) was prepared, added to 0.5 L of ion-exchanged water, and stirred for hydrolysis thereof.

Thereafter, in the same manner as in Example 11, about 50 g of the bright pigment subsequently coated with the hydroxide or hydrated oxide of lanthanum and the hydroxide or hydrated oxide of neodymium in this order was added to the hydrolysis solution and stirred for 30 minutes. Then, the suspension was filtered with filter paper to obtain a filtered solid. The filtered solid was dried at 120° C. for 2 hours. In this case, the amount of the organic silane coupling agent added was 1 mass %. Thus, the bright pigment of Example 13 was obtained.

As a result of an analysis, in the bright pigment thus obtained, the deposition amount of the hydroxide or hydrated oxide of lanthanum was about 0.4 mass % in terms of the lanthanum, the deposition amount of the hydroxide or hydrated oxide of neodymium was about 0.8 mass % in terms of the neodymium, and the deposition amount of the organic silane coupling agent was 0.1 mass %. In this case, the deposition amount of the lanthanum was equivalent to approximately 1.6 mass % of the rutile-type titanium dioxide. Furthermore, the deposition amount of the neodymium was equivalent to approximately 3.2 mass % of the rutile-type titanium dioxide. Accordingly, the total deposition amount of the lanthanum and neodymium was equivalent to approximately 4.8 mass % of the rutile-type titanium dioxide.

Example 14

Example 14 is a bright pigment further coated with the hydroxide or hydrated oxide of cerium in addition to the coating layers of Example 13. Specifically, Example 14 is a bright pigment in which each coating layer of rutile-type titanium dioxide, the hydroxide or hydrated oxide of lanthanum, the hydroxide or hydrated oxide of cerium, the hydroxide or hydrated oxide of neodymium, and an oxazoline group-containing polymer is formed on flaky glass in this order.

A commercially available bright pigment (MC1020RS) was coated with the hydroxide or hydrated oxide of lanthanum in the same manner as in Example 6. A 1 mass % aqueous solution of cerium (III) nitrate hexahydrate and 4.0 g of a 1N aqueous solution of sodium hydroxide were added slowly to the suspension including the bright pigment coated with the hydroxide or hydrated oxide of lanthanum over a period of 10 minutes. After the addition, the reaction was continued for 10 minutes while keeping the resulting suspension at pH 6.

Thereafter, the treatment with the hydroxide or hydrated oxide of neodymium and the oxazoline group-containing polymer was performed thereon in the same manner as in Example 6. Thus, the bright pigment of Example 14 was obtained.

As a result of an analysis, in the bright pigment thus obtained, the deposition amount of the hydroxide or hydrated oxide of lanthanum was about 0.4 mass % in terms of the lanthanum, the deposition amount of the hydroxide or hydrated oxide of cerium was about 0.1 mass % in terms of the cerium, the deposition amount of the hydroxide or hydrated oxide of neodymium was about 0.8 mass % in terms of the neodymium, and the deposition amount of the oxazoline group-containing polymer was 0.5 mass %. In this case, the deposition amount of the lanthanum was equivalent to approximately 1.6 mass % of the rutile-type titanium dioxide. Further, the deposition amount of the cerium was equivalent to approximately 0.4 mass % of the rutile-type titanium dioxide. Furthermore, the deposition amount of the neodymium was equivalent to approximately 3.2 mass % of the rutile-type titanium dioxide. Accordingly, the total deposition amount of the lanthanum and cerium was equivalent to approximately 5.2 mass % of the rutile-type titanium dioxide.

In Example 15 to Example 22, METASHINE (registered trademark) ME2025PS manufactured by Nippon Sheet Glass Co., Ltd. was used as the bright pigment having a silver coating layer. This bright pigment has an average particle size of 23 μm, an average thickness of 1.4 μm and a deposition amount of silver of about 24 mass %, and exhibits a metallic luster with yellow turbidity and high brightness.

Example 15

Example 15 is a bright pigment in which each coating layer of silver, the hydroxide or hydrated oxide of neodymium and an oxazoline group-containing polymer is formed on flaky glass.

First, a 4 mass % aqueous solution of neodymium nitrate was prepared using 2.4 g of neodymium (III) nitrate hexahydrate [Nd(NO$_3$)$_3$.6H$_2$O]. About 50 g of a commercially available bright pigment (ME2025PS) was suspended in 0.5 liter (L) of purified water and kept at 75° C. in a water bath, and the pH of the suspension was adjusted to pH 6 with diluted nitric acid. Subsequently, the neodymium nitrate solution and 8.0 g of a 1N aqueous solution of sodium hydroxide were added slowly to the suspension over a period of 10 minutes. After the addition, the resulting suspension was stirred at 75° C. for 30 minutes while keeping it at pH 6. Subsequently, the suspension was filtered with filter paper to obtain a filtered solid. The filtered solid was washed with water. Thus, a bright pigment coated with the hydroxide or hydrated oxide of neodymium was obtained.

Furthermore, 2.0 g of an oxazoline group-containing polymer (EPOCROS WS-700 manufactured by Nippon Shokubai, Co., Ltd., resin solid content: 25 mass %, oxazoline value: 220 g/eq) was prepared, added to 0.5 L of ion-exchanged water, and stirred. Thus, a treatment liquid was obtained. Thereafter, about 50 g of the bright pigment coated with the hydroxide or hydrated oxide of neodymium was added to the treatment liquid and stirred for 30 minutes. Then, the suspension was filtered with filter paper to obtain a filtered solid. The filtered solid was dried at 120° C. for 2 hours. Thus, the bright pigment of Example 15 was obtained.

As a result of an analysis, in the bright pigment thus obtained, the deposition amount of the hydroxide or hydrated oxide of neodymium was about 0.8 mass % in terms of the neodymium, and the deposition amount of the oxazoline group-containing polymer was 0.5 mass %. In this case, the deposition amount of the neodymium was equivalent to approximately 3.2 mass % of the silver.

Example 16

Example 16 is a bright pigment in which each coating layer of silver, the hydroxide or hydrated oxide of neodymium and an oxazoline group-containing polymer/organic silane coupling agent is formed on flaky glass in this order.

As an organic silane coupling agent, 0.5 g of 3-methacryloxy propyltriethoxysilane (A-174 manufactured by Nippon Unicar Co., Ltd.) was prepared, added to 0.5 L of ion-exchanged water, and stirred for hydrolysis thereof. 2 g of an oxazoline group-containing polymer (EPOCROS WS-700 manufactured by Nippon Shokubai, Co., Ltd., resin solid content: 25 mass %, oxazoline value: 220 g/eq) was prepared, and added to the hydrolysis solution of the silane coupling agent.

Thereafter, about 50 g of the bright pigment coated with the hydroxide or hydrated oxide of neodymium was added to the hydrolysis solution and stirred for 30 minutes. Then, the suspension was filtered with filter paper to obtain a filtered solid. The filtered solid was dried at 120° C. for 2 hours. Thus, the bright pigment of Example 16 was obtained.

As a result of an analysis, in the bright pigment thus obtained, the deposition amount of the hydroxide or hydrated oxide of neodymium was about 0.8 mass % in terms of the neodymium, and the total deposition amount of the oxazoline group-containing polymer and the organic silane coupling agent was 0.6 mass %. In this case, the deposition amount of the neodymium was equivalent to approximately 3.2 mass % of the silver.

Example 17

Example 17 is a bright pigment in which each coating layer of silver, the hydroxide or hydrated oxide and phosphate of molybdenum, the hydroxide or hydrated oxide of neodymium and an oxazoline group-containing polymer is formed on flaky glass in this order.

The coating layer including the hydroxide or hydrated oxide and phosphate of molybdenum was formed as follows. First, a 2 mass % aqueous solution of sodium molybdate was prepared using 0.6 g of sodium molybdate (VI) (Na$_2$MoO$_4$.2H$_2$O). Next, in the same manner in Example 5, about 50 g of a commercially available bright pigment (ME2025PS) was suspended in 0.5 L of purified water and kept at 75° C. in a water bath, and the pH of the suspension was adjusted to pH 6 with diluted nitric acid. The sodium molybdate (VI) aqueous solution and 20 mL of a 0.1 N phosphoric acid solution were added slowly to the suspension over a period of 10 minutes. After the addition, the reaction was continued for 10 minutes while keeping the resulting suspension at pH 6.

Thereafter, the treatment with the hydroxide or hydrated oxide of neodymium and the oxazoline group-containing polymer was performed thereon in the same manner as in Example 15. Thus, the bright pigment of Example 17 was obtained.

As a result of an analysis, in the bright pigment thus obtained, the deposition amount of the hydroxide or hydrated oxide of neodymium was about 0.8 mass % in terms of the neodymium, the deposition amount of the hydroxide or hydrated oxide of molybdenum was about 0.3 mass % in terms of the molybdenum, the deposition amount of the phosphate of the molybdenum was about 0.03 mass % in terms of the phosphorus, and the deposition amount of the oxazoline group-containing polymer was 0.5 mass %. In this case, the deposition amount of the neodymium was equivalent to approximately 3.2 mass % of the silver. Further, the deposition amount of the molybdenum was equivalent to approximately 1.2 mass % of the silver. Accordingly, the total deposition amount of the neodymium and molybdenum was equivalent to approximately 4.4 mass % of the silver.

Example 18

In Example 18, the hydroxide or hydrated oxide of vanadium was used for coating instead of the hydroxide or hydrated oxide of molybdenum in Example 17. Specifically, Example 18 is a bright pigment in which each coating layer of silver, the hydroxide or hydrated oxide and phosphate of vanadium, the hydroxide or hydrated oxide of neodymium and an oxazoline group-containing polymer is formed on flaky glass in this order.

The coating layer including the hydroxide or hydrated oxide and phosphate of vanadium was formed as follows. First, a 2 mass % aqueous solution of sodium vanadate was prepared using 0.6 g of sodium vanadate (V) (NaVO$_3$). Next, in the same manner in Example 17, about 50 g of a commercially available bright pigment (ME2025PS) was suspended in 0.5 L of purified water and kept at 75° C. in a water bath, and the pH of the suspension was adjusted to pH 6 with diluted nitric acid. The sodium vanadate (VI) aqueous solution and 20 mL of a 0.1 N phosphoric acid solution were added slowly to the suspension over a period of 10 minutes. After the addition, the reaction was continued for 10 minutes while keeping the resulting suspension at pH 6.

Thereafter, the treatment with the hydroxide or hydrated oxide of neodymium and the oxazoline group-containing polymer was performed thereon in the same manner as in Example 15. Thus, the bright pigment of Example 18 was obtained.

As a result of an analysis, in the bright pigment thus obtained, the deposition amount of the hydroxide or hydrated oxide of neodymium was about 0.8 mass % in terms of the neodymium, the deposition amount of the hydroxide or hydrated oxide of vanadium was about 0.3 mass % in terms of the vanadium, the deposition amount of the phosphate of the vanadium was about 0.03 mass % in terms of the phosphorus, and the deposition amount of the oxazoline group-containing polymer was 0.5 mass %. In this case, the deposition amount of the neodymium was equivalent to approximately 3.2 mass % of the silver. Further, the deposition amount of the vanadium was equivalent to approximately 1.2 mass % of the silver. Accordingly, the total deposition amount of the neodymium and vanadium was equivalent to approximately 4.4 mass % of the silver.

Example 19

In Example 19, the hydroxide or hydrated oxide of tungsten was used for coating instead of the hydroxide or hydrated oxide of molybdenum in Example 17. Specifically, Example 19 is a bright pigment in which each coating layer of silver, the hydroxide or hydrated oxide and phosphate of tungsten, the hydroxide or hydrated oxide of neodymium and an oxazoline group-containing polymer is formed on flaky glass in this order.

The coating layer including the hydroxide or hydrated oxide and phosphate of tungsten was formed as follows. First, a 2 mass % aqueous solution of sodium tungstate was prepared using 0.6 g of sodium tungstate (VI) dihydrate ($Na_2WO_4.2H_2O$). Next, in the same manner in Example 17, about 50 g of a commercially available bright pigment (ME2025PS) was suspended in 0.5 L of purified water and kept at 75° C. in a water bath, and the pH of the suspension was adjusted to pH 6 with diluted nitric acid. The sodium tungstate (VI) aqueous solution and 20 mL of a 0.1 N phosphoric acid solution were added slowly to the suspension over a period of 10 minutes. After the addition, the reaction was continued for 10 minutes while keeping the resulting suspension at pH 6.

Thereafter, the treatment with the hydroxide or hydrated oxide of neodymium and the oxazoline group-containing polymer was performed thereon in the same manner as in Example 15. Thus, the bright pigment of Example 19 was obtained.

As a result of an analysis, in the bright pigment thus obtained, the deposition amount of the hydroxide or hydrated oxide of neodymium was about 0.8 mass % in terms of the neodymium, the deposition amount of the hydroxide or hydrated oxide of tungsten was about 0.1 mass % in terms of the tungsten, the deposition amount of the phosphate of the tungsten was about 0.01 mass % in terms of the phosphorus, and the deposition amount of the oxazoline group-containing polymer was 0.5 mass %. In this case, the deposition amount of the neodymium was equivalent to approximately 3.2 mass % of the silver. Further, the deposition amount of the tungsten was equivalent to approximately 0.4 mass % of the silver. Accordingly, the total deposition amount of the neodymium and tungsten was equivalent to approximately 3.6 mass % of the silver.

Example 20

In Example 20, the hydroxide or hydrated oxide of lanthanum was used for coating instead of the hydroxide or hydrated oxide of molybdenum in Example 17. Specifically, Example 20 is a bright pigment in which each coating layer of silver, the hydroxide or hydrated oxide of lanthanum, the hydroxide or hydrated oxide of neodymium and an oxazoline group-containing polymer is formed on flaky glass in this order.

The hydroxide or hydrated oxide of lanthanum was formed in the following manner. First, a 2 mass % aqueous solution of lanthanum nitrate was prepared using 1.2 g of lanthanum (III) nitrate hexahydrate [$La(NO_3)_3.6H_2O$]. About 50 g of a commercially available bright pigment (ME2025PS) was suspended in 0.5 L of purified water and kept at 75° C. in a water bath, and the pH of the suspension was adjusted to pH 6 with diluted nitric acid. The lanthanum nitrate solution and 4.0 g of a 1N aqueous solution of sodium hydroxide were added slowly to the suspension over a period of 10 minutes. After the addition, the resulting suspension was stirred at 75° C. for 10 minutes while continuously keeping it at pH 6.

Thereafter, the treatment with the hydroxide or hydrated oxide of neodymium and the oxazoline group-containing polymer was performed thereon in the same manner as in Example 15. Thus, the bright pigment of Example 20 was obtained.

As a result of an analysis, in the bright pigment thus obtained, the deposition amount of the hydroxide or hydrated oxide of lanthanum was about 0.4 mass % in terms of the lanthanum, the deposition amount of the hydroxide or hydrated oxide of neodymium was about 0.8 mass % in terms of the neodymium, and the deposition amount of the oxazoline group-containing polymer was 0.5 mass %. In this case, the deposition amount of the lanthanum was equivalent to about 1.6 mass % of the silver. The deposition amount of the neodymium was equivalent to about 3.2 mass % of the silver. Accordingly, the total deposition amount of the lanthanum and neodymium was equivalent to approximately 4.8 mass % of the silver.

Example 21

Example 21 is a bright pigment coated with an organic silane coupling agent, instead of the oxazoline group-containing polymer in Example 20. Specifically, Example 21 is a bright pigment in which each coating layer of silver, the hydroxide or hydrated oxide of lanthanum, the hydroxide or hydrated oxide of neodymium, and an organic silane coupling agent is formed on flaky glass in this order.

As an organic silane coupling agent, 0.5 g of 3-methacryloxy propyltriethoxysilane (A-174 manufactured by Nippon Unicar Co., Ltd.) was prepared, added to 0.5 L of ion-exchanged water, and stirred for hydrolysis thereof.

Thereafter, in the same manner as in Example 20, about 50 g of the bright pigment subsequently coated with the hydroxide or hydrated oxide of lanthanum and the hydroxide or hydrated oxide of neodymium in this order was added to the hydrolysis solution and stirred for 30 minutes. Then, the suspension was filtered with filter paper to obtain a filtered solid. The filtered solid was dried at 120° C. for 2 hours. Thus, the bright pigment of Example 21 was obtained.

As a result of an analysis, in the bright pigment thus obtained, the deposition amount of the hydroxide or hydrated oxide of lanthanum was about 0.4 mass % in terms of the lanthanum, the deposition amount of the hydroxide or hydrated oxide of neodymium was about 0.8 mass % in terms of the neodymium, and the deposition amount of the organic silane coupling agent was 0.1 mass %. In this case, the deposition amount of the lanthanum was equivalent to approximately 1.6 mass % of the silver. Furthermore, the deposition amount of the neodymium was equivalent to approximately 3.2 mass % of the silver. Accordingly, the total deposition amount of the lanthanum and neodymium was equivalent to approximately 4.8 mass % of the silver.

Example 22

Example 22 is a bright pigment further coated with the hydroxide or hydrated oxide of tungsten in addition to the coating layers of Example 20. Specifically, Example 22 is a bright pigment in which each coating layer of silver, the hydroxide or hydrated oxide and phosphate of tungsten, the hydroxide or hydrated oxide of lanthanum, the hydroxide or hydrated oxide of neodymium and an oxazoline group-containing polymer is formed on flaky glass in this order.

A commercially available bright pigment (ME2025PS) was coated with the hydroxide or hydrated oxide and phosphate of tungsten in the same manner as in Example 19.

Thereafter, the treatment with the hydroxide or hydrated oxide of lanthanum, the hydroxide or hydrated oxide of neodymium and the oxazoline group-containing polymer was performed thereon in the same manner as in Example 20. Thus, the bright pigment of Example 22 was obtained.

As a result of an analysis, in the bright pigment thus obtained, the deposition amount of the hydroxide or hydrated oxide of tungsten was about 0.1 mass % in terms of the tungsten, the deposition amount of the phosphate of the tungsten was about 0.01 mass % in terms of the phosphorus, the deposition amount of the hydroxide or hydrated oxide of lanthanum was about 0.4 mass % in terms of the lanthanum, the deposition amount of the hydroxide or hydrated oxide of neodymium was about 0.8 mass % in terms of the neodymium, and the deposition amount of the oxazoline group-containing polymer was 0.5 mass %. In this case, the deposition amount of the tungsten was equivalent to approximately 0.4 mass % of the silver. The deposition amount of the lanthanum was equivalent to approximately 1.6 mass % of the silver. The deposition amount of the neodymium was equivalent to approximately 3.2 mass % of the silver. Accordingly, the total deposition amount of the tungsten, lanthanum and neodymium was equivalent to approximately 5.2 mass % of the silver.

Comparative Example 1

METASHINE (registered trademark) MC1020RS manufactured by Nippon Sheet Glass Co., Ltd. was prepared as the bright pigment of Comparative Example 1.

Comparative Example 2

METASHINE (registered trademark) MC1020RB manufactured by Nippon Sheet Glass Co., Ltd. was prepared as the bright pigment of Comparative Example 2.

Comparative Example 3

Comparative Example 3 is a bright pigment coated with the hydroxide or hydrated oxide of cerium instead of the hydroxide or hydrated oxide of neodymium in Example 1. Specifically, Comparative Example 3 is a bright pigment in which each coating layer of rutile-type titanium dioxide, the hydroxide or hydrated oxide of cerium and an oxazoline group-containing polymer is formed on flaky glass in this order.

About 50 g of a bright pigment (MC1020RS) was suspended in 0.5 L of pure water and kept at 75° C. in a water bath. Then, the cerium nitrate solution (1 mass %) and 4.0 g of a 1N aqueous solution of sodium hydroxide were added slowly to the suspension over a period of 10 minutes. After the addition, the reaction was continued for 10 minutes while keeping the resulting suspension at pH 6.

Thereafter, in the same manner as in Example 1, coating with the oxazoline group-containing polymer was carried out, and then the suspension was filtered with filter paper to obtain a filtered solid. The filtered solid was dried at 120° C. for 2 hours. Thus, the bright pigment of Comparative Example 3 was obtained.

As a result of an analysis, in the bright pigment thus obtained, the deposition amount of the hydroxide or hydrated oxide of cerium was about 0.3 mass % in terms of the cerium, and the deposition amount of the oxazoline group-containing polymer was 0.4 mass %. In this case, the deposition amount of the cerium was equivalent to approximately 3.6 mass % of the rutile-type titanium dioxide.

Comparative Example 4

Comparative Example 4 is a bright pigment coated with the hydroxide or hydrated oxide of cerium instead of the hydroxide or hydrated oxide of neodymium in Example 8. Specifically, Comparative Example 4 is a bright pigment in which each coating layer of rutile-type titanium dioxide, the hydroxide or hydrated oxide of cerium and an oxazoline group-containing polymer is formed on flaky glass in this order.

About 50 g of a bright pigment (MC1020RB) was suspended in 0.5 L of pure water and kept at 75° C. in a water bath. Then, the cerium nitrate solution (1 mass %) and 4.0 g of a 1N aqueous solution of sodium hydroxide were added slowly to the suspension over a period of 10 minutes. After the addition, the reaction was continued for 10 minutes while keeping the resulting suspension at pH 6.

Thereafter, in the same manner as in Example 1, coating with the oxazoline group-containing polymer was carried out, and then the suspension was filtered with filter paper to obtain a filtered solid. The filtered solid was dried at 120° C. for 2 hours. Thus, the bright pigment of Comparative Example 4 was obtained.

As a result of an analysis, in the bright pigment thus obtained, the deposition amount of the hydroxide or hydrated oxide of cerium was about 0.3 mass % in terms of the cerium, and the deposition amount of the oxazoline group-containing polymer was 0.4 mass %. In this case, the deposition amount of the cerium was equivalent to approximately 3.6 mass % of the rutile-type titanium dioxide.

Comparative Example 5

METASHINE (registered trademark) ME2025PS manufactured by Nippon Sheet Glass Co., Ltd. was prepared as the bright pigment of Comparative Example 5.

Comparative Example 6

Comparative Example 6 is a bright pigment coated with the hydroxide or hydrated oxide of aluminum instead of the hydroxide or hydrated oxide of neodymium in Example 1.

Specifically, Comparative Example 6 is a bright pigment in which each coating layer of rutile-type titanium dioxide, the hydroxide or hydrated oxide of aluminum and an oxazoline group-containing polymer is formed on flaky glass in this order.

As an aluminum compound, a 2 mass % aqueous solution of aluminum chloride was prepared using 0.6 g of aluminum chloride hexahydrate. Further, the aqueous solution containing aluminum chloride and 18.0 g of a 1N aqueous solution of sodium hydroxide were added simultaneously to the suspension in which about 50 g of a commercially available bright pigment (MC1020RS) was dispersed in 0.5 L of purified water in the same manner as in Example 1. The obtained filtered solid was washed and dried. Thus, a bright pigment coated with the hydroxide or hydrated oxide of aluminum was obtained.

Meanwhile, 2.0 g of an oxazoline group-containing polymer (EPOCROS WS-700 manufactured by Nippon Shokubai, Co., Ltd., resin solid content: 25 mass %, oxazoline value: 220 g/eq) was prepared, added to 0.5 L of ion-exchanged water, and stirred in the same manner as in Example 1. Thus, a treatment liquid was obtained.

Thereafter, 50 g of the bright pigment coated with the hydroxide or hydrated oxide of aluminum was added to the above-mentioned treatment liquid to prepare a suspension, and stirred for 30 minutes. Then, the suspension was filtered with filter paper to obtain a filtered solid. The filtered solid was dried at 120° C. for 2 hours. Thus, the bright pigment of Comparative Example 6 was obtained.

As a result of an analysis, in the bright pigment thus obtained, the deposition amount of the hydroxide or hydrated oxide of aluminum was about 0.3 mass % in terms of the aluminum, and the deposition amount of the oxazoline group-containing polymer was 0.5 mass %. In this case, the deposition amount of the aluminum was equivalent to approximately 3.6 mass % of the rutile-type titanium dioxide.

(Test and Evaluation)

Paints prepared using the bright pigments obtained in Examples and Comparative Examples were applied by the following method, and the yellow turbidity and weather resistance thereof were evaluated.

(Preparation of Resin for Water-based Metallic Paint)

First, a resin for a water-based metallic paint was prepared. A reaction vessel was charged with 70 parts by mass of butyl cellosolve, and further charged with 40 parts by mass of styrene monomer, 60 parts by mass of methyl methacrylate monomer, 25 parts by mass of methacrylate monomer, 45 parts by mass of hydroxymethyl methacrylate monomer, 120 parts by mass of butyl acrylate monomer, 3 parts by mass of lauryl mercaptan, and 3 parts by mass of azobisisobutyronitrile, allowed to react with each other at 120° C. while stirring, and then further stirred for 1 hour.

250 parts by mass of pure water and 30 parts by mass of dimethylethanolamine further were added. Thus, a water-based acrylic resin having a non-volatile content of 45 mass % and a number average molecular weight of 5000 was obtained. The acid value of this resin was 60, and the hydroxyl value thereof was 65.

(Preparation of Water-based Metallic Paint)

Next, a water-based metallic paint was prepared. 15 parts by mass of each of the bright pigments of Examples and Comparative Examples and 40 parts by mass of hexamethoxy methylol melamine as a crosslinking agent were mixed to 200 parts by mass of the above-mentioned acrylic resin and stirred. The pigment weight content (PWC) of each of the bright pigments of Examples and Comparative Examples was adjusted to 10 mass %. The viscosity of the resulting resin was adjusted with pure water, and thus a water-based metallic paint was obtained.

(Preparation of Water-based Clear Paint)

In the same manner as for the resin for water-based metallic paints as described above, a polymer was prepared using 12 parts by mass of methyl methacrylate monomer, 5 parts by mass of methacrylate monomer, 15 parts by mass of hydroxymethyl methacrylate monomer, 60 parts by mass of butyl acrylate monomer, and 3 parts by mass of lauryl mercaptan. Next, the polymer thus obtained was neutralized with dimethylethanolamine, and further diluted with pure water. Thus, a water-based acrylic resin having a non-volatile content of 40 mass % was obtained. To this acrylic resin was added hexamethoxy methylol melamine in a solid content ratio of 40 mass %, and the viscosity of the resulting resin was adjusted with pure water, and thus a water-based clear paint was obtained.

(Production of Coated Test Plate for Evaluation)

As a coated plate that had been subjected to zinc phosphate conversion treatment, cathodic electrodeposition coating and intermediate coating in this order, D-7 (intermediate coating color: Munsell color system N=9.0) manufactured by Nippon Route Service Co. was used. The above-mentioned water-based metallic paint was applied to the coated plate by air spraying so as to have a dried thickness of 20 μm, and thereafter dried at 80° C. for 10 minutes. Subsequently, the water-based clear paint further was applied by air spraying so as to have a dried thickness of 30 μm, and left standing for 10 minutes. The coated plate thus obtained was baked at 150° C. in a dryer for 30 minutes to obtain a coated test plate for evaluation.

(Method of Accelerated Weathering Test)

An accelerated weathering test was conducted for 480 consecutive hours on the coated test plate thus prepared, with a Super Xenon Weather Meter (SX75 manufactured by Suga Test Instruments Co., Ltd.). The test conditions are as follows.
Light source: water-cooled xenon
Filter: quartz+#295
Irradiance: 180 (W/m$^2$, 300 nm to 400 nm)
Black panel temperature: 63 (° C.)
Humidity: 50±5 (% RH)
Irradiation method: continuous
Water spray cycle: 18 minutes per 120 minutes
Number of revolutions of sample rack: 1/30 revolutions per second (2 rpm).

The coated test plate further was subjected to evaluation of the yellow turbidity derived from the bright pigment particles in the coating film and the color change between before and after the accelerated weathering test, using a multi-angle spectrocolorimeter X-Rite MA68II (manufactured by Color Techno System Corp.). In a coating film containing the bright pigment, changes in lightness and saturation when viewed from different angles, a so-called "flop" property, are observed. In such a coating film, reflections of light are high in a highlight area and the brightness is high, while reflections of light are low in a shaded area.

A complementary color derived from the bright pigment in the coating film or yellow turbidity in diffuse reflection can be evaluated by measuring the value of yellow (b*) in the shaded area. The greater the numerical value of b* in the shaded area is, the stronger the complementary color derived from the bright pigment in the coating film or the yellow turbidity in diffuse reflection should be.

On the other hand, the variation of the lightness or saturation before and after the accelerated weathering test can be evaluated since the reflection on the surface of the bright pigment is strong as well as the lightness and saturation of the bright coating film are enhanced in a highlight area.

(Evaluation of Yellow Turbidity)

Figure 2:
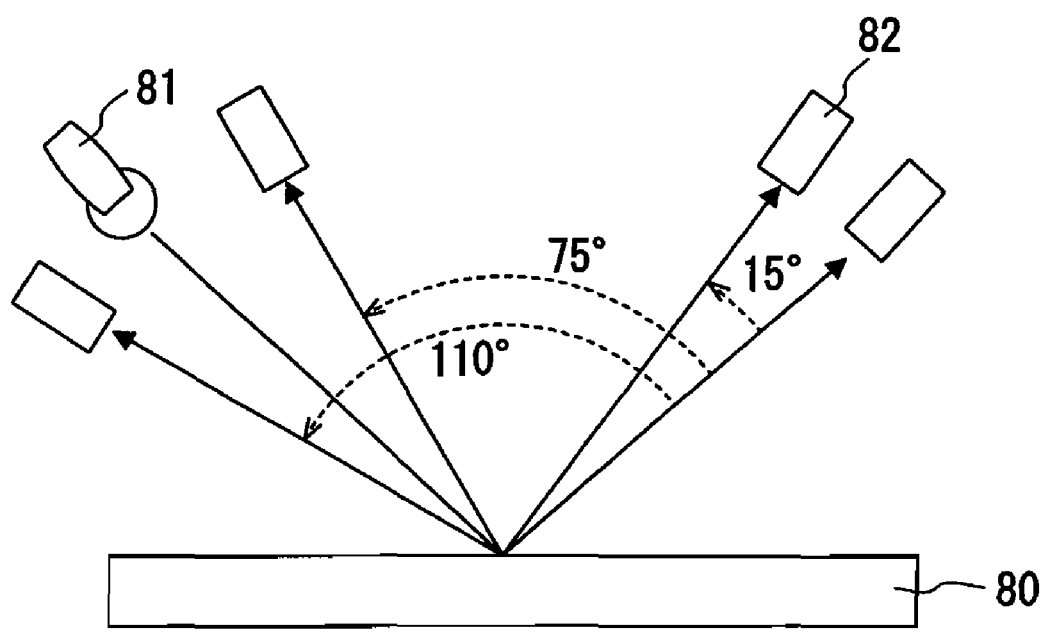
FIG. 2 is a diagram illustrating the principle for evaluating color difference.

Hereinafter, description will be given with reference to FIG. 2. First, as shown in FIG. 2, a light source 81 is provided at a position inclining at 45° from the perpendicular direction with respect to the surface of the a coating film 80 (that is, 45° from the surface of the film), so that light is allowed to enter the surface of the coating film at an angle of 45°. A color tone of the reflected light incident to a detector 82 at an angle of 15° from the specular reflection direction of the incident light to the light source direction (that is, 45° from the surface of the film) is taken as a highlight color tone. On the other hand, a color tone of the reflected light incident thereto at angles of 75° and 110° from the specular reflection direction of the incident light (that is, 45° from the surface of the film) to the light source direction is taken as a shaded color tone.

Here, $b^*_{15°}$, $b^*_{75°}$, and $b^*_{110°}$ each are a value measured based on $L^*a^*b^*$ color system at angles, respectively, of 15°, 75°, and 110° from the specular reflection direction to the light source direction. It should be noted that a D65 standard light source was employed as the light source, which is prescribed in JIS Z 8720 (2000) and ISO/CIE 10526, CIE standard colorimetric illuminants.

(Evaluation of Weather Resistance)

The measurement was carried out at an angle of 15° from the specular direction to obtain the values of $L^*$, $a^*$ and $b^*$ before and after the accelerated weathering test and to obtain the differences $\Delta L^*$, $\Delta a^*$ and $\Delta b^*$. Furthermore, the color difference $\Delta E^*$ was calculated from these values $\Delta L^*$, $\Delta a^*$ and $\Delta b^*$ according to the following Equations, and a comparison was carried out. $L_0^*$, $a_0^*$ and $b_0^*$ are the values obtained before the accelerated weathering test, while $L_{480}^*$, $a_{480}^*$ and $b_{480}^*$ are the values obtained after the accelerated weathering test.

$$\Delta L^* = L_0^* - L_{480}^* \quad \text{(Equation 1)}$$

$$\Delta a^* = a_0^* - a_{480}^* \quad \text{(Equation 2)}$$

$$\Delta b^* = b_0^* - b_{480}^* \quad \text{(Equation 3)}$$

$$\Delta E^* = \{(\Delta L^*)^2 + (\Delta a^*)^2 + (\Delta b^*)^2\}^{1/2} \quad \text{(Equation 4)}$$

Table 1 indicates the results of multi-angle spectrophotometric colorimetry and the results of observation by visual inspection as the evaluation results on yellow turbidity. The criteria of the observation by visual inspection are as follows.

◉: Coating with a metallic blue color with no yellow turbidity observed by visual inspection ○: Coating with a metallic color with no yellow turbidity observed by visual inspection △: Coating with a metallic color with some yellow turbidity observed by visual inspection x: Coating with a metallic color with high yellow turbidity observed by visual inspection Further, Table 2 indicates the color difference between before and after the accelerated weathering test as the evaluation results on the weather resistance.

TABLE 1

| | YELLOW TURBIDITY (b*) | | | OBSERVATION BY VISUAL INSPECTION |
|---|---|---|---|---|
| | @15° | @75° | @110° | |
| EX. 1 | 0.09 | 3.40 | 3.05 | ◉ |
| EX. 2 | 0.02 | 3.28 | 2.95 | ◉ |

TABLE 1-continued

| | YELLOW TURBIDITY (b*) | | | OBSERVATION BY VISUAL INSPECTION |
|---|---|---|---|---|
| | @15° | @75° | @110° | |
| EX. 3 | −0.03 | 3.11 | 2.88 | ◉ |
| EX. 4 | −0.06 | 3.07 | 2.73 | ◉ |
| EX. 5 | 0.05 | 3.15 | 2.93 | ◉ |
| EX. 6 | 0.04 | 3.12 | 2.90 | ◉ |
| EX. 7 | 0.38 | 4.04 | 3.85 | ○ |
| C. EX. 1 | 0.11 | 4.56 | 4.29 | △ |
| C. EX. 3 | 0.56 | 5.72 | 5.33 | X |
| C. EX. 6 | 0.14 | 4.45 | 4.27 | △ |
| EX. 8 | −17.42 | 13.02 | 9.83 | ○ |
| EX. 9 | −17.39 | 13.37 | 10.03 | ○ |
| EX. 10 | −17.58 | 12.81 | 9.64 | ○ |
| EX. 11 | −17.60 | 12.66 | 9.53 | ○ |
| EX. 12 | −17.52 | 12.95 | 9.99 | ○ |
| EX. 13 | −17.33 | 13.03 | 10.12 | ○ |
| EX. 14 | −17.30 | 14.74 | 10.65 | △ |
| C. EX. 2 | −17.27 | 15.34 | 11.90 | X |
| C. EX. 4 | −15.95 | 16.58 | 12.94 | X |
| EX. 15 | 8.93 | 6.04 | 6.44 | ○ |
| EX. 16 | 8.72 | 5.94 | 6.30 | ○ |
| EX. 17 | 8.26 | 5.37 | 5.84 | ○ |
| EX. 18 | 8.36 | 5.59 | 5.93 | ○ |
| EX. 19 | 8.72 | 5.90 | 6.34 | ○ |
| EX. 20 | 8.91 | 6.00 | 6.47 | ○ |
| EX. 21 | 8.85 | 5.96 | 5.36 | ○ |
| EX. 22 | 8.60 | 5.81 | 5.25 | ○ |
| C. EX. 5 | 14.45 | 8.92 | 9.62 | X |

TABLE 2

| | WEATHERING TEST/EVALUATION OF COLOR DIFFERENCE (@15°) | | | |
|---|---|---|---|---|
| | ΔL* | Δa* | Δb* | ΔE* |
| EX. 1 | −0.14 | −0.13 | −0.37 | 0.42 |
| EX. 2 | −0.41 | −0.17 | −0.20 | 0.49 |
| EX. 3 | −0.24 | −0.21 | −0.33 | 0.46 |
| EX. 4 | −0.12 | 0.16 | −0.17 | 0.26 |
| EX. 5 | −0.26 | 0.12 | −0.29 | 0.41 |
| EX. 6 | −0.29 | −0.03 | −0.24 | 0.38 |
| EX. 7 | −0.11 | 0.05 | −0.17 | 0.21 |
| C. EX. 1 | 0.10 | −0.73 | −1.31 | 1.50 |
| C. EX. 3 | 0.07 | −0.42 | −0.75 | 0.86 |
| C. EX. 6 | 0.09 | −0.61 | −0.89 | 1.08 |
| EX. 8 | 0.05 | −0.26 | 0.42 | 0.50 |
| EX. 9 | 0.07 | −0.29 | 0.37 | 0.48 |
| EX. 10 | 0.12 | −0.17 | 0.35 | 0.41 |
| EX. 11 | 0.08 | −0.14 | 0.26 | 0.31 |
| EX. 12 | 0.04 | −0.21 | 0.24 | 0.32 |
| EX. 13 | 0.13 | −0.20 | 0.29 | 0.38 |
| EX. 14 | 0.02 | −0.16 | 0.20 | 0.26 |
| C. EX. 2 | 0.16 | −1.33 | −2.25 | 2.62 |
| C. EX. 4 | 0.34 | −0.81 | 0.62 | 1.08 |
| EX. 15 | 0.10 | 0.18 | 0.45 | 0.49 |
| EX. 16 | 0.08 | 0.25 | 0.49 | 0.56 |
| EX. 17 | 0.12 | 0.37 | 0.31 | 0.50 |
| EX. 18 | 0.15 | 0.32 | 0.29 | 0.46 |
| EX. 19 | 0.09 | 0.11 | 0.22 | 0.26 |
| EX. 20 | 0.01 | 0.25 | 0.36 | 0.44 |
| EX. 21 | 0.12 | 0.16 | 0.40 | 0.45 |
| EX. 22 | 0.05 | 0.19 | 0.35 | 0.40 |
| C. EX. 5 | 1.30 | −1.03 | 5.83 | 6.06 |

As already described above, the complementary color derived from the bright pigment in the coating film or the yellow turbidity in diffuse reflection is reflected in the value b* in the shaded areas (75° and 110°). Specifically, the smaller the value b* in the shaded areas (75° and 110°) is, the lower the yellow turbidity is. As indicated in Table 1, the values b* of the bright pigments of Examples in shaded areas (75° and 110°) were smaller than those of the bright pigments of Comparative Examples. That is, the bright pigments of Examples exhibited lower yellow turbidity than the bright pigments of Comparative Examples. This was confirmed also by the observation by visual inspection.

As indicated in Table 2, the values ΔE* of the coating films formed using the bright pigments of Examples were smaller than the values ΔE* of the coating films formed using the bright pigments of Comparative Examples. It is meant that the smaller the value ΔE* is, the smaller the color tone variation of the coating film before and after the weather resistance test, that is, the more excellent the weather resistance thereof is. In other words, the coating films formed using the bright pigments of Examples had excellent weather resistance compared to those in Comparative Examples.

The invention claimed is:

1. A bright pigment comprising:
   a flaky substrate;
   a first layer formed on the flaky substrate, wherein the first layer comprises, as its main component, one material selected from the group consisting of titanium dioxide, silver and a silver alloy; and
   a second layer formed so that the first layer is interposed between the flaky substrate and the second layer, wherein the second layer comprises a hydroxide of neodymium or a hydrated oxide of neodymium.

2. The bright pigment according to claim 1, wherein the second layer comprises, in addition to the hydroxide of neodymium or the hydrated oxide of neodymium, a hydroxide of at least one metal selected from the group consisting lanthanum, cerium, tungsten, aluminum, zirconium, molybdenum, and vanadium or a hydrated oxide of at least one metal selected from the group consisting of lanthanum, cerium, tungsten, aluminum, zirconium, molybdenum, and vanadium.

3. The bright pigment according to claim 1, further comprising: a surface layer comprising a compound having an oxazoline group, wherein the surface layer coats the second layer.

4. The bright pigment according to claim 3, wherein the surface layer further comprises a silane coupling agent.

5. The bright pigment according to claim 1, wherein the flaky substrate is substantially composed of one material selected from the group consisting of glass, mica, synthetic mica, silica, and alumina.

6. A resin composition comprising the bright pigment according to claim 1.

7. A paint comprising the bright pigment according to claim 1.

8. A printing ink comprising the bright pigment according to claim 1.

9. A coated product comprising:
   a base material;
   a first coating film having lightness of 6 to 9.5 according to the Munsell color system, wherein the first coating film is a film formed of a base-coat paint (A) comprising a white pigment, and formed on the base material; and
   a second coating film is a film formed of a base-coat paint (B) comprising the bright pigment according to claim 1 and formed onto the first coating film.

* * * * *

UNITED STATES PATENT AND TRADEMARK OFFICE
CERTIFICATE OF CORRECTION

PATENT NO. : 8,409,708 B2
APPLICATION NO. : 12/682953
DATED : April 2, 2013
INVENTOR(S) : Kitamura It is certified that error appears in the above-identified patent and that said Letters Patent is hereby corrected as shown below:

Title page, item 56, column 2, under "Other Publications", line 2, delete "ND207" and insert --ND2O7--.

Title page, item 56, column 2, under "Other Publications", lines 6-7, after "pp." delete "52835 Customer Number".

Title page 2, item 56, column 2, under "Foreign Patent Documents", line 29, delete "LC" and insert --JP--.

In the Claims

Column 39, line 22, in Claim 1, after "silver" insert --,--.

Column 39, line 30, in Claim 2, after "consisting" insert --of--.

Signed and Sealed this
Fifth Day of November, 2013

Teresa Stanek Rea
*Deputy Director of the United States Patent and Trademark Office*